US011399316B2

(12) United States Patent
Li et al.

(10) Patent No.: US 11,399,316 B2
(45) Date of Patent: Jul. 26, 2022

(54) METHOD AND APPARATUS TO SUPPORT RESOURCE SHARING BETWEEN AN ACCESS LINK AND A BACKHAUL LINK

(71) Applicant: Huawei Technologies Co., Ltd., Shenzhen (CN)

(72) Inventors: You Li, Shenzhen (CN); Shitong Yuan, Chengdu (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/074,197

(22) Filed: Oct. 19, 2020

(65) Prior Publication Data

US 2021/0037432 A1    Feb. 4, 2021

Related U.S. Application Data

(63) Continuation of application No. PCT/CN2019/082898, filed on Apr. 16, 2019.

(30) Foreign Application Priority Data

Apr. 19, 2018  (CN) .......................... 201810356185.8

(51) Int. Cl.
*H04W 36/00*  (2009.01)
*H04W 36/38*  (2009.01)

(52) U.S. Cl.
CPC ... *H04W 36/0027* (2013.01); *H04W 36/0069* (2018.08); *H04W 36/0072* (2013.01); *H04W 36/38* (2013.01)

(58) Field of Classification Search
CPC ......... H04W 36/0027; H04W 36/0069; H04W 36/0072; H04W 36/38; H04W 84/005;

(Continued)

(56) References Cited

U.S. PATENT DOCUMENTS

2013/0250918 A1*  9/2013  Liu ...................... H04W 28/08
                                                                370/332
2014/0112240 A1    4/2014  Takahashi et al.
(Continued)

FOREIGN PATENT DOCUMENTS

CN    102076041 A    5/2011
CN    102164385 A    8/2011
(Continued)

OTHER PUBLICATIONS

Teyeb et al, "Dynamic Relaying in 3GPP LTE-Advanced Networks", EURASIP Journal on Wireless Communications and Networking, Jan. 1, 2009 (Jan. 1, 2009), vol. 2009, No. 1, DOI: 10.1155/2009/731317, ISSN: 1687-1499, p. 731317, XP055020271, hereinafter Teyeb. (Year: 2009).*

(Continued)

*Primary Examiner* — Ronald Eisner
(74) *Attorney, Agent, or Firm* — Leydig, Voit & Mayer, Ltd.

(57) ABSTRACT

This application relates to a communications method. The method in this application includes: receiving, by the wireless backhaul device, a message that is sent by a first network device and that is used to indicate the wireless backhaul device to be handed over to a second network device; and sending, by the wireless backhaul device to the second network device in a process in which the wireless backhaul device is handed over to the second network device or in a case in which the wireless backhaul device completes being handed over to the second network device, a message carrying information about a resource of a first link. This application is applicable to a handover procedure of the wireless backhaul device.

13 Claims, 11 Drawing Sheets

(58) Field of Classification Search
CPC ... H04W 84/047; H04W 36/00; H04W 36/08; H04W 36/18; H04W 36/0011
See application file for complete search history.

(56) References Cited

U.S. PATENT DOCUMENTS

| | | |
|---|---|---|
| 2014/0286314 A1 | 9/2014 | Xu et al. |
| 2015/0304016 A1 | 10/2015 | Choi et al. |

FOREIGN PATENT DOCUMENTS

| | | | |
|---|---|---|---|
| CN | 102752818 A | 10/2012 | |
| CN | 102752820 A | 10/2012 | |
| CN | 102907159 A | 1/2013 | |
| CN | 104025639 A | 9/2014 | |
| CN | 105578443 A | 5/2016 | |
| CN | 105814938 A | 7/2016 | |
| EP | 2680640 A1 * | 1/2014 | ........ H04W 72/0486 |
| EP | 2680640 A1 | 1/2014 | |
| EP | 2908588 A1 | 8/2015 | |
| JP | 2016028481 A | 2/2016 | |
| WO | 2014056343 A1 | 4/2014 | |

OTHER PUBLICATIONS

Teyeb et al., "Dynamic Relaying in 3GPP L TE-Advanced Networks," EURASIP Journal on Wireless Communications and Networking, vol. 2009, No. 1, XP055020271, total 11 pages, Hindawi Publishing Corporation, London, England (Jan. 1, 2009).

"Forward compatibility considerations on NR Integrated Access and Backhaul," 3GPP TSG-RAN WG1 #86 R1-167119, pp. 1-5, 3rd Generation Partnership Project, Valbonne, France (Aug. 22-26, 2016).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2( Release 15)," 3GPP TS 36.300 V15.1.0, pp. 1-341, 3rd Generation Partnership Project, Valbonne, France (Mar. 2018).

"3rd Generation Partnership Project; Technical Specification Group Radio Access Network; NR; Physical layer procedures for control (Release 15)," 3GPP TS 38.213 V15.1.0, pp. 1-77, 3rd Generation Partnership Project, Valbonne, France (Mar. 2018).

"3rd Generation Partnership Project; Technical Specification Group Radio Access Network; NR; NR and NG-RAN Overall Description; Stage 2 (Release 15)," 3GPP TS 38.300 V15.1.0, pp. 1-71, 3rd Generation Partnership Project, Valbonne, France (Mar. 2018).

* cited by examiner

METHOD AND APPARATUS TO SUPPORT RESOURCE SHARING BETWEEN AN ACCESS LINK AND A BACKHAUL LINK

CROSS-REFERENCE TO RELATED APPLICATIONS

This application is a continuation of International Application No. PCT/CN2019/082898, filed on Apr. 16, 2019, which claims priority to Chinese Patent Application No. 201810356185.8, filed on Apr. 19, 2018. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

Currently, a new radio (NR) already supports a networking scenario of a multi-hop multi-connection relay node (RN), which is also referred to as a wireless backhaul device. In the networking scenario, mobility of the wireless backhaul device is supported. For example, the wireless backhaul device may be deployed on a top of a motor vehicle, the wireless backhaul device may be accessed by a terminal and provide a data backhaul service for the terminal, and the wireless backhaul device moves with the motor vehicle. The wireless backhaul device needs to be handed over to another serving base station in a moving process of the wireless backhaul device. An ideal scenario is that the terminal accessing the wireless backhaul device continues to maintain a data connection in the handover process of the wireless backhaul device. However, in the prior art, there is no method that allows the wireless backhaul device to be handed over to another serving base station. If the wireless backhaul device cannot be handed over to another serving base station, data transmission between the wireless backhaul device and the terminal side device is interrupted.

SUMMARY

Embodiments of this application provide a communications method and apparatus, to resolve a problem that transmission between a wireless backhaul device and a terminal side device is interrupted because the wireless backhaul device cannot be handed over to another serving base station.

According to a first aspect, an embodiment of this application provides a communications method, including: receiving, by a wireless backhaul device, a message that is sent by a first network device and that is used to indicate the wireless backhaul device to be handed over to a second network device; and sending, by the wireless backhaul device to the second network device in a process in which the wireless backhaul device is handed over to the second network device or in a case in which the wireless backhaul device completes being handed over to the second network device, a message carrying information about a resource of a first link, where the first link is a communications link between the wireless backhaul device and a terminal side device. According to the method, the wireless backhaul device may receive the message used to indicate the wireless backhaul device to be handed over to the second network device. When leaving or being about to leave coverage of the first network device, the wireless backhaul device may be handed over to the second network device, and the wireless backhaul device may provide the second network device with the information about the resource of the first link. Therefore, when allocating a resource of a second link, the second network device may refer to the information about the resource of the first link, so that a conflict between the to-be-allocated resource of the second link and the resource allocated by the wireless backhaul device to the first link can be avoided, and data transmission between the wireless backhaul device and the terminal can avoid being interrupted.

The wireless backhaul device may be an RN or an IAB node, the first network device is a source base station, and the second network device is a destination base station. The information about the resource of the first link is used to indicate a transmission resource that is available when the wireless backhaul device communicates with the terminal side device on the first link. For example, the message used to indicate the wireless backhaul device to be handed over to the second network device may be an RRC connection reconfiguration message, where the RRC connection reconfiguration message includes a handover command.

In a possible design, the message carrying the information about the resource of the first link is used to notify the second network device that the wireless backhaul device has accessed the second network device. For example, the message carrying the information about the resource of the first link may be an RRC connection reconfiguration complete message.

In a possible design, after the sending, by the wireless backhaul device to the second network device, a message carrying information about a resource of a first link, the wireless backhaul device may receive configuration information that is about the resource of the first link and that is sent by the second network device, and then may send the configuration information about the resource of the first link to the terminal side device.

When receiving the configuration information about the resource of the first link, the wireless backhaul device may use the received configuration information about the resource of the first link, and forward the configuration information about the resource of the first link to the terminal side device. Alternatively, the wireless backhaul device may regenerate configuration information about the resource of the first link with reference to the received configuration information about the resource of the first link, and send the regenerated configuration information about the resource of the first link to the terminal side device. According to the method, when configuration information that is about the resource of the second link and that is generated by the second network device conflicts with the resource of the first link, the wireless backhaul device may receive the configuration information that is about the resource of the first link and that is sent by the second network device. The configuration information about the resource of the first link does not conflict with the resource indicated by the configuration information about the resource of the second link. Further, the resource that is indicated by the configuration information about the resource of the first link and that is used when the wireless backhaul device communicates with the terminal side device does not conflict with the resource used when the wireless backhaul device communicates with the second network device, thereby avoiding a problem of transmission interruption caused by the resource conflict.

According to a second aspect, an embodiment of this application provides a communications method, including: receiving, by a wireless backhaul device, a message that is sent by a first network device and that is used to indicate the wireless backhaul device to be handed over to a second network device, where the message used to indicate the wireless backhaul device to be handed over to the second network device carries configuration information about a resource of a first link, and the first link is a communications link between the wireless backhaul device and a terminal side device; and sending, by the wireless backhaul device, the configuration information about the resource of the first link to the terminal side device. According to the method, the wireless backhaul device may receive the message used to indicate the wireless backhaul device to be handed over to the second network device. A method for the wireless backhaul device to be handed over to another serving base station is provided. The message used to indicate the wireless backhaul device to be handed over to the second network device further carries the configuration information about the resource of the first link. After receiving the configuration information about the resource of the first link, when communicating with the first network device, the wireless backhaul device may use the resource indicated by the configuration information about the resource of the first link for communication. Therefore, the wireless backhaul device can be handed over to the second network device, and after the wireless backhaul device is handed over to the second network device, transmission interruption caused by a conflict between a resource of a second link and the resource of the first link can be avoided.

In a possible design, the message used to indicate the wireless backhaul device to be handed over to the second network device further carries indication information, where the indication information is used to indicate a resource of a second link, the resource of the second link is a resource that is available when the wireless backhaul device detects a downlink control channel PDCCH sent by the second network device, and the second link is a communications link between the wireless backhaul device and the second network device.

According to a third aspect, an embodiment of this application provides a communications method, including: receiving, by a second network device in a process in which a wireless backhaul device is handed over to the second network device or in a case in which a wireless backhaul device completes being handed over to the second network device, a message that is sent by the wireless backhaul device and that carries information about a resource of a first link, where the first link is a communications link between the wireless backhaul device and a terminal side device; and determining, by the second network device, configuration information about a resource of a second link based on the information about the resource of the first link, where the second link is a communications link between the wireless backhaul device and the second network device. According to the method, a first network device may send, to the wireless backhaul device, a message used to indicate the wireless backhaul device to be handed over to the second network device. When leaving or being about to leave coverage of the first network device, the wireless backhaul device may be handed over to the second network device, and the second network device may determine the configuration information about the resource of the second link based on the information about the resource of the first link. Because the second network device learns of the information about the resource of the first link, when allocating the resource of the second link, the second wireless device may refer to the resource that has been allocated by the wireless backhaul device to the first link. According to the method, the wireless backhaul device can be handed over to the second network device, a conflict between the to-be-allocated resource of the second link and the resource allocated by the wireless backhaul device to the first link can be avoided, and data transmission between the wireless backhaul device and the terminal can avoid being interrupted.

In a possible design, the message carrying the information about the resource of the first link is used to notify the second network device that the wireless backhaul device has accessed the second network device. Optionally, the message carrying the information about the resource of the first link may be an RRC connection reconfiguration complete message.

In a possible design, after the determining, by the second network device, configuration information about a resource of a second link based on the information about the resource of the first link, the second network device sends configuration information about the resource of the first link to the wireless backhaul device. According to the method, when the configuration information about the resource of the second link conflicts with the resource of the first link, the second network device may generate the configuration information about the resource of the first link, and may avoid the resource of the second link when generating the configuration information about the resource of the first link. Therefore, after the wireless backhaul device is handed over to the second network device, the resource of the first link does not conflict with the resource of the second link, so that a problem of a transmission interruption caused by the resource conflict can be avoided.

According to a fourth aspect, an embodiment of this application provides a communications method, including: receiving, by a second network device, a first message sent by a first network device, where the first message carries first indication information, the first indication information includes information about a resource that is of a first link and that is configured by a wireless backhaul device, information about a resource that is of a third link and that is determined by the first network device based on the information about the resource of the first link, or information about a resource that is of the first link and that is configured by the first network device; and sending, by the second network device, a second message to the first network device, where the second message is used to indicate that a request for handing over the wireless backhaul device to the second network device is accepted. The first message is used to request to hand over the wireless backhaul device to the second network device, the first link is a communications link between the wireless backhaul device and a terminal side device, and the third link is a communications link between the wireless backhaul device and the first network device. According to the method, the first network device may send the first message to the second network device, to request to hand over the wireless backhaul device to the second network device, and then the second network device may return the second message in response to the request of the first network device that the wireless backhaul device may be handed over to the second network device, so that the wireless backhaul device can be handed over to the second network device. In addition, the first message carries the first indication information, so that the second network device can refer to the first indication information when determining a resource of a second link, thereby avoiding a conflict between the resource of the second link and the resource of the first link, and avoiding interruption of data transmission between the wireless backhaul device and the terminal.

For example, the first message may be a handover request message, and the second message may be a handover request response message.

In a possible design, the second message carries configuration information about the resource of the first link.

In a possible design, the first message further carries second indication information, where the second indication information is used to indicate a resource of a second link, the resource of the second link is a resource that is available when the wireless backhaul device detects a downlink control channel PDCCH sent by the second network device, and the second link is a communications link between the wireless backhaul device and the second network device. According to the method, if the first message carries the second indication information, in a process in which the wireless backhaul device is handed over to the second network device, the second network device may use the resource indicated by the second indication information. Because the resource indicated by the second indication information is staggered from a CORESET configured by the wireless backhaul device for the terminal, when the second network device obtains the second indication information, the process in which the wireless backhaul device is handed over to the second network device may be performed synchronously with a process in which the wireless backhaul device performs resource reconfiguration on the terminal, to avoid a phenomenon that exists after the handover is completed and that data transmission between the terminal and the wireless backhaul device is interrupted because of a delay introduced in the process of performing resource reconfiguration on the terminal.

In a possible design, the second message further carries third indication information, where the third indication information is used to indicate a resource of a second link, the resource of the second link is a resource that is available when the wireless backhaul device detects a downlink control channel PDCCH sent by the second network device, and the second link is a communications link between the wireless backhaul device and the second network device. According to the method, the second network device sends the third indication information to the wireless backhaul device, so that the wireless backhaul device avoids the resource indicated by the third indication information when performing resource reconfiguration on the terminal side device. Further, a process in which the wireless backhaul device is handed over to the second network device may be performed synchronously with a process in which the wireless backhaul device performs resource reconfiguration on the terminal, to avoid a phenomenon that exists after the handover is completed and that data transmission between the terminal and the wireless backhaul device is interrupted because of a delay introduced in the process of performing resource reconfiguration on the terminal.

According to a fifth aspect, an embodiment of this application provides a communications method, including: sending, by a first network device, a first message to a second network device, where the first message carries first indication information, the first indication information includes information about a resource that is of a first link and that is configured by a wireless backhaul device, information about a resource that is of a third link and that is determined by the first network device based on the information about the resource of the first link, or information about a resource that is of the first link and that is configured by the first network device; and receiving, by the first network device, a second message sent by the second network device, where the second message is used to indicate that a request for handing over the wireless backhaul device to the second network device is accepted. The first message is used to request to hand over the wireless backhaul device to the second network device, the first link is a communications link between the wireless backhaul device and a terminal side device, and the third link is a communications link between the wireless backhaul device and the first network device. According to the method, the first network device may send the first message to the second network device, to request to hand over the wireless backhaul device to the second network device, and then the second network device may return the second message in response to the request of the first device that the wireless backhaul device may be handed over to the second network device, so that the wireless backhaul device can be handed over to the second network device. In addition, the first message carries the first indication information, so that the second network device can refer to the first indication information when determining a resource of a second link, thereby avoiding a conflict between the resource of the second link and the resource of the first link, and avoiding interruption of data transmission between the wireless backhaul device and the terminal.

For example, the first message may be a handover request message, and the second message may be a handover request response message.

In a possible design, the second message carries configuration information about the resource of the first link.

In a possible design, after the receiving, by the first network device, a second message sent by the second network device, the first network device sends a third message to the wireless backhaul device, where the third message carries the configuration information about the resource of the first link, and the third message is used to indicate the wireless backhaul device to be handed over to the second network device. Optionally, the third message may be an RRC connection reconfiguration message, where the RRC connection reconfiguration message includes a handover command.

In a possible design, the first message further carries second indication information, where the second indication information is used to indicate a resource of a second link, the resource of the second link is a resource that is available when the wireless backhaul device detects a downlink control channel PDCCH sent by the second network device, and the second link is a communications link between the wireless backhaul device and the second network device. According to the method, if the first message carries the second indication information, in a process in which the wireless backhaul device is handed over to the second network device, the second network device may use the resource indicated by the second indication information. Because the resource indicated by the second indication information is staggered from a CORESET configured by the wireless backhaul device for the terminal, when the second network device obtains the second indication information, the process in which the wireless backhaul device is handed over to the second network device may be performed synchronously with a process in which the wireless backhaul device performs resource reconfiguration on the terminal, to avoid a phenomenon that exists after the handover is completed and that data transmission between the terminal and the wireless backhaul device is interrupted because of a delay introduced in the process of performing resource reconfiguration on the terminal.

In a possible design, the second message further carries third indication information, where the third indication information is used to indicate a resource of a second link, the resource of the second link is a resource that is available when the wireless backhaul device detects a downlink control channel PDCCH sent by the second network device, and the second link is a communications link between the wireless backhaul device and the second network device. According to the method, the second network device sends the third indication information to the wireless backhaul device, so that the wireless backhaul device avoids the resource indicated by the third indication information when performing resource reconfiguration on the terminal side device. Further, a process in which the wireless backhaul device is handed over to the second network device may be performed synchronously with a process in which the wireless backhaul device performs resource reconfiguration on the terminal, to avoid a phenomenon that exists after the handover is completed and that data transmission between the terminal and the wireless backhaul device is interrupted because of a delay introduced in the process of performing resource reconfiguration on the terminal.

In a possible design, after the receiving, by the first network device, a second message sent by the second network device, the first network device sends a fourth message to the wireless backhaul device, where the fourth message carries the configuration information about the resource of the first link and the third indication information, and the fourth message is used to indicate the wireless backhaul device to be handed over to the second network device. Optionally, the fourth message may be an RRC connection reconfiguration message, where the RRC connection reconfiguration message includes a handover command.

According to a sixth aspect, an embodiment of this application provides an apparatus. The apparatus has a function of implementing behavior of the wireless backhaul device in the foregoing method design. The function may be implemented by hardware, or may be implemented by hardware by executing corresponding software. The hardware or the software includes one or more modules corresponding to the foregoing function. For example, the apparatus may be the wireless backhaul device, or may be a chip in the wireless backhaul device.

In a possible design, the apparatus is the wireless backhaul device, the wireless backhaul device includes a processor, and the processor is configured to support the wireless backhaul device in performing a corresponding function in the foregoing method. Further, the wireless backhaul device may further include a transmitter and a receiver, where the transmitter and the receiver are configured to support communication between the wireless backhaul device and a terminal side device, a first network device, and a second network device. Further, the wireless backhaul device may further include a memory. The memory is configured to couple to the processor, and stores a program instruction and data that may be needed for the wireless backhaul device.

According to a seventh aspect, an embodiment of this application provides an apparatus. The apparatus has a function of implementing behavior of the network device (the first network device or the second network device) in the foregoing method design. The function may be implemented by hardware, or may be implemented by hardware by executing corresponding software. The hardware or the software includes one or more modules corresponding to the foregoing function. For example, the apparatus may be the network device, or may be a chip in the network device.

In a possible design, the apparatus is the network device, the network device includes a processor, and the processor is configured to support the network device in performing a corresponding function in the foregoing method. Further, the network device may further include a transmitter and a receiver, where the transmitter and the receiver are configured to support communication between the network device and a terminal side device and communication between the network device and a wireless backhaul device. Further, the network device may further include a memory. The memory is configured to couple to the processor, and stores a program instruction and data that are necessary for the network device.

According to an eighth aspect, an embodiment of this application provides a communications system. The system includes the wireless backhaul device and the network device in the foregoing aspects. Optionally, the system may further include a terminal side device.

According to a ninth aspect, an embodiment of this application provides a computer storage medium, configured to store a computer software instruction used by the foregoing wireless backhaul device, where the computer storage medium includes a program designed for performing the first aspect and the second aspect.

According to a tenth aspect, an embodiment of this application provides a computer storage medium, configured to store a computer software instruction used by the foregoing second network device, where the computer storage medium includes a program designed for performing the third aspect and the fourth aspect.

According to an eleventh aspect, an embodiment of this application provides a computer storage medium, configured to store a computer software instruction used by the foregoing first network device, where the computer storage medium includes a program designed for performing the fifth aspect.

According to a twelfth aspect, an embodiment of this application provides a computer program product including an instruction. When the computer program product runs on a computer, the computer is enabled to perform the method according to the first aspect and the second aspect.

According to a thirteenth aspect, an embodiment of this application provides a computer program product including an instruction. When the computer program product runs on a computer, the computer is enabled to perform the method according to the third aspect and the fourth aspect.

According to a fourteenth aspect, an embodiment of this application provides a computer program product including an instruction. When the computer program product runs on a computer, the computer is enabled to perform the method according to the fifth aspect.

According to a fifteenth aspect, an embodiment of this application provides a chip system, applied to a wireless backhaul device, where the chip system includes at least one processor, a memory, and a transceiver circuit, the memory, the transceiver circuit, and the at least one processor are interconnected by using a line, the at least one memory stores an instruction, and the instruction is executed by the processor to perform operations of the wireless backhaul device in the method according to the first aspect and the second aspect.

According to a sixteenth aspect, an embodiment of this application provides a chip system, applied to a second network device, where the chip system includes at least one processor, a memory, and a transceiver circuit, the memory, the transceiver circuit, and the at least one processor are interconnected by using a line, the at least one memory stores an instruction, and the instruction is executed by the processor to perform operations of the second network device in the method according to the third aspect and the fourth aspect.

According to a seventeenth aspect, an embodiment of this application provides a chip system, applied to a first network device, where the chip system includes at least one processor, a memory, and a transceiver circuit, the memory, the transceiver circuit, and the at least one processor are interconnected by using a line, the at least one memory stores an instruction, and the instruction is executed by the processor to perform operations of the first network device in the method according to the fifth aspect.

According to the communications method provided in the embodiments of this application, the first network device may send, to the wireless backhaul device, the message used to indicate the wireless backhaul device to be handed over to the second network device. When leaving or being about to leave the coverage of the first network device, the wireless backhaul device may be handed over to the second network device, and the second wireless device may determine the configuration information about the resource of the second link based on the information about the resource of the first link. Because the second network device learns of the information about the resource of the first link, when allocating the resource of the second link, the second wireless device may refer to the resource that has been allocated by the wireless backhaul device to the first link. According to the method, the wireless backhaul device can be handed over to the second network device, the conflict between the to-be-allocated resource of the second link and the resource allocated by the wireless backhaul device to the first link can be avoided, and the data transmission between the wireless backhaul device and the terminal can avoid being interrupted.

DESCRIPTION OF EMBODIMENTS

Figure 1:
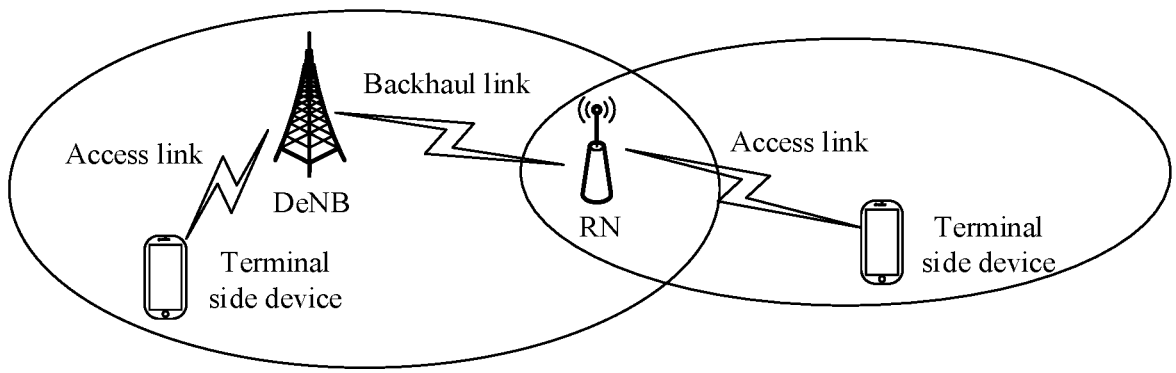
FIG. 1 is a schematic diagram of a logical structure of a communications system according to an embodiment of this application.

The following further describes in detail this application with reference to accompanying drawings. A specific operation method in method embodiments may also be applied to an apparatus embodiment or a system embodiment. In the descriptions of this application, unless otherwise stated, "at least one" means one or more, and "a plurality of" means two or more. "/" means "or". For example, A/B may represent A or B, and "and/or" in this specification describes only an association relationship for describing associated objects and represents that three relationships may exist. For example, A and/or B may represent the following three cases: Only A exists, both A and B exist, and only B exists. A and B may be singular or plural. "At least one (one piece) of the following" or a similar expression thereof refers to any combination of these items, including any combination of singular items (pieces) or plural items (pieces). For example, at least one (one piece) of a, b, and c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

A network architecture and a service scenario described in the embodiments of this application are intended to describe technical solutions in the embodiments of this application more clearly, and do not constitute a limitation on the technical solutions provided in the embodiments of this application. A person of ordinary skill in the art may learn that: With the evolution of the network architecture and the emergence of new service scenarios, the technical solutions provided in the embodiments of this application are also applicable to similar technical problems.

It should be noted that, in this application, the word "an example" or "for example" is used to represent giving an example, an illustration, or a description. Any embodiment or design scheme described as an "an example" or "for example" in this application should not be explained as being more preferred or having more advantages than another embodiment or design scheme. Exactly, use of the word "an example", "for example", or the like is intended to present a relative concept in a specific manner.

It should be noted that in this application, "of", "corresponding (relevant)", and "corresponding" may be interchangeably used sometimes. It should be noted that, consistent meanings are expressed when differences are not emphasized.

Before the technical solutions of this application are described in detail, for ease of understanding, a scenario to which the embodiments of this application are applied is described first.

A relay technology is introduced in long term evolution (LTE) R10, and an RN may be deployed in a communications system to forward data between a base station and a terminal side device. As shown in FIG. 1, the communications system includes a donor base station e.g. Donor evolved Node B (DeNB), the RN, and the terminal side device. A communications link between the RN and the DeNB is a backhaul (BH) link, and a communications link between the RN and the terminal side device is an access (AC) link. The R10 relay supports a single-hop single-connection scenario; to be specific, there is one RN between the terminal side device and the DeNB. In addition, a location of the RN is fixed, and mobility of the RN is not supported.

The terminal side device in this application is a device or a chip that has a wireless transceiver function, and may be deployed on land, including an indoor device, an outdoor device, a handheld device, or a vehicle-mounted device, or may be deployed on a water surface (for example, a ship), or may be deployed in the air (for example, on an aircraft, a balloon, or a satellite). The device that has the wireless transceiver function includes various types of user equipment (UE), a mobile phone, a tablet computer (pad), a computer with the wireless transceiver function, a wireless data card, a virtual reality (VR) terminal device, an augmented reality (AR) terminal device, a machine-type communication (MTC) terminal device, a terminal device in industrial control, a terminal device in self-driving, a terminal device in telemedicine, a terminal device in a smart grid, a terminal device in transportation safety, a terminal device in a smart city, a wearable device (such as a smartwatch, a smart band, or a pedometer), and the like. In systems using different radio access technologies, names of terminals having similar wireless communication functions may be different. Only for ease of description, in the embodiments of this application, the foregoing apparatuses having the wireless transceiver communication function are collectively referred to as the terminal side device.

In a 5th generation (5G) wireless relay networking scenario, for example, a NR or 5G relay scenario, in addition to the LTE relay scenario shown in FIG. 1, a multi-hop multi-connection scenario is further supported.

Multi-hop means that at least two RNs are used in a process of transmitting data of the terminal side device to the base station (for example, a Donor next generation NodeB (DgNB)). For example, if only one RN is used in the process of transmitting the data of the terminal side device to the DgNB, there is a single hop; if two RNs are used in the process of transmitting the data of the terminal side device to the DgNB, there are two hops; if three RNs are used, there are three hops, and so on.

Multi-connection means that one RN may be provided with a backhaul service by at least two RNs or DgNBs.

Figure 2:
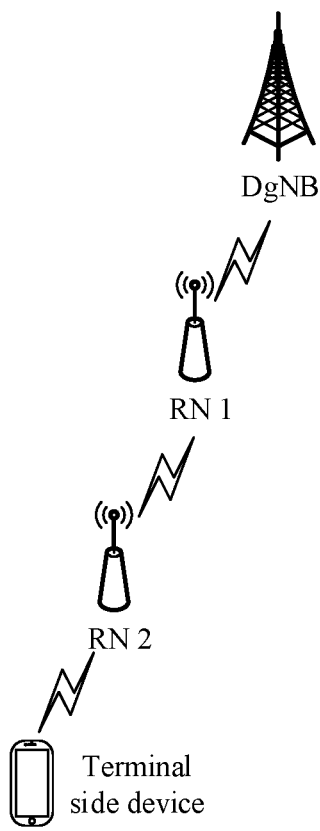
FIG. 2 is an example schematic diagram of a multi-hop scenario according to an embodiment of this application.

FIG. 2 is an example schematic diagram of a multi-hop scenario, including a terminal side device, at least two RNs, and a DgNB serving the RNs. In the scenario, a network topology on a radio access network side may be considered as a tree-based topology; to be specific, there is a clear hierarchical relationship between the RNs and the DgNB. Each RN considers a node that provides a backhaul service for the RN as a unique parent node. For example, in FIG. 2, a parent node of an RN 2 is an RN 1, and a parent node of the RN 1 is the DgNB. An uplink data packet of the terminal side device served by the RN 2 may be sequentially transmitted to the DgNB via the RN 2 and the RN 1, and then is sent by the DgNB to a gateway device such as a user plane function (UPF) unit in a 5G network. Correspondingly, a transmission manner of a downlink data packet is: The DgNB receives the downlink data packet from the gateway device, and then sequentially sends the downlink data packet to the terminal side device via the RN 1 and the RN 2.

Figure 3:
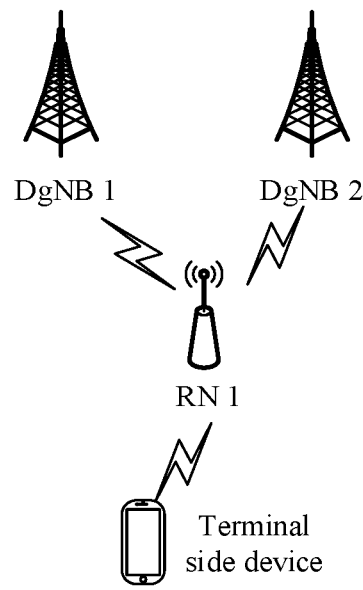
FIG. 3 is an example schematic diagram of a multi-connection scenario according to an embodiment of this application.

FIG. 3 is an example schematic diagram of a multi-connection scenario. An RN 1 has two parent nodes: a DgNB 1 and a DgNB 2. It may be understood that FIG. 3 is an example, and parent nodes of the RN 1 may alternatively be one RN and one DgNB, or may be a plurality of RNs. This is not limited in this application.

Figure 4:
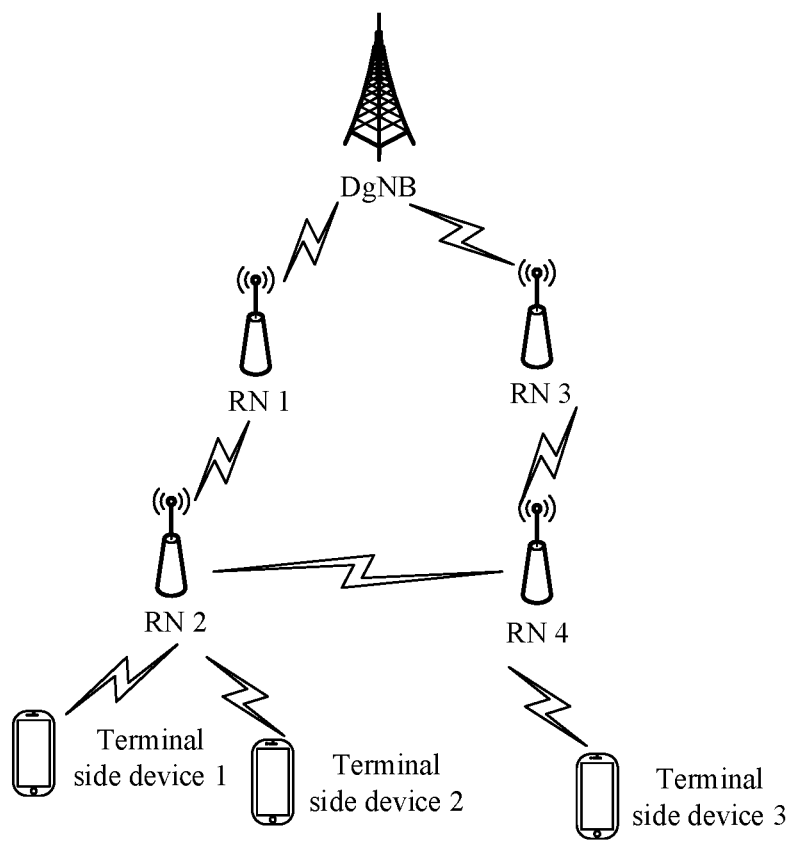
FIG. 4 is an example schematic diagram of a multi-hop multi-connection scenario according to an embodiment of this application.

FIG. 4 is an example schematic diagram of a multi-hop multi-connection scenario. An RN 2 has two parent nodes: an RN 1 and an RN 4; in other words, both the RN 1 and the RN 4 may provide a backhaul service for the RN 2. Specifically, uplink data of a terminal side device 1 may be sequentially transmitted to a DgNB via the RN 2 and the RN 1, or may be sequentially transmitted to a DgNB via the RN 2, the RN 4, and an RN 3. In a reversed direction, the DgNB may sequentially send downlink data to the terminal side device 1 via the RN 1 and the RN 2, or may sequentially transmit downlink data to the terminal side device 1 via the RN 3, the RN 4, and the RN 2. Therefore, the RN 2, the RN 1, and the DgNB form one transmission path, and the RN 2, the RN 4, the RN 3, and the DgNB form another transmission path.

Figure 5:
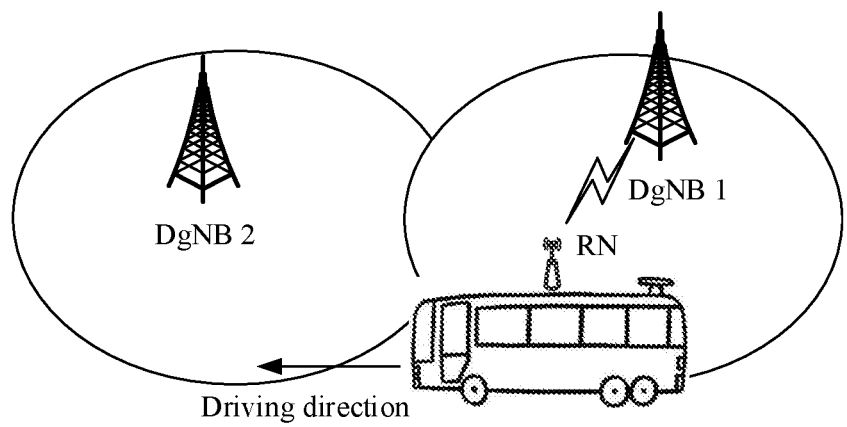
FIG. 5 is a schematic diagram of a possible application scenario according to an embodiment of this application.

In a 5G relay scenario, mobility of an RN is supported. The embodiments of this application are specifically applied to a scenario in which the RN moves. For example, as shown in FIG. 5, a typical application scenario is that the RN is deployed in a vehicle, and a terminal side device may access the RN. When the motor vehicle moves, both the RN and the terminal side device used by a passenger in the vehicle move correspondingly. To ensure that a service of the terminal side device is not interrupted, the terminal side device keeps a connection to the RN, and the RN needs to be handed over to another DgNB as the vehicle moves.

It should be noted that an example in which the embodiments of this application are applied to an NR system (which may also be referred to as a 5G system) is used for description. A method provided in the embodiments of this application may also be applied to another network, for example, may be applied to a 4G network. When the method provided in the embodiments of this application is applied to the 4G network, a wireless backhaul device in the following may be referred to as an RN. When the method provided in the embodiments of this application is applied to the NR system or the 5G network, a wireless backhaul device in the following may be referred to as an integrated access and backhaul (IAB) node.

Figure 6:
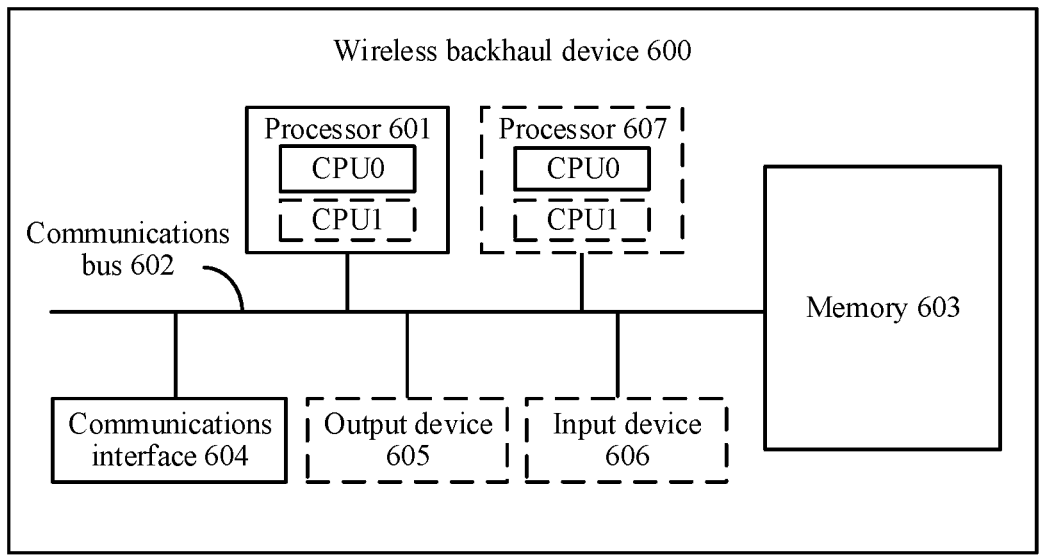
FIG. 6 is a schematic structural diagram of a wireless backhaul device according to an embodiment of this application.

To avoid a problem that data transmission between a terminal side device and a wireless backhaul device is interrupted, an embodiment of this application provides a wireless backhaul device. As shown in FIG. 6, a wireless backhaul device 600 includes at least one processor 601, a communications bus 602, a memory 603, and at least one communications interface 604.

The processor 601 may be a general purpose central processing unit (CPU), a microprocessor, an application-specific integrated circuit (ASIC), or one or more integrated circuits configured to control program execution in the solutions in this application.

The communications bus 602 may include at least one pathway, to connect the memory 603, the processor 601, and the like.

The communications interface 604 may be any apparatus such as a transceiver, and is configured to communicate with another device or a communications network, for example, an Ethernet, a radio access network (RAN), or a wireless local area network (WLAN).

The memory 603 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may alternatively be integrated with the processor.

The memory 603 is configured to store application program code for performing the solutions in this application, and the processor 601 controls the performing. The processor 601 is configured to execute the application program code stored in the memory 603, to implement the method provided in the following embodiments of this application.

In a specific implementation, in an embodiment, the processor 601 may include one or more CPUs, for example, a CPU 0 and a CPU 1 in FIG. 6.

In specific implementation, in an embodiment, the wireless backhaul device 60 may include a plurality of processors, for example, the processor 601 and a processor 607 in FIG. 6. Each of the processors may be a single-core processor, or may be a multi-core processor. The processor herein may refer to one or more devices, circuits, and/or processing cores configured to process data (for example, a computer program instruction).

In specific implementation, in an embodiment, the wireless backhaul device 600 may further include an output device 605 and an input device 606.

An embodiment of this application further provides a network device, which may be specifically a first network device and a second network device in the following description. The first network device is a source base station, and may be specifically a source gNB (next generation NodeB) accessed by a wireless backhaul device before the wireless backhaul device is handed over. The second network device is a destination base station, and may be specifically a destination gNB accessed by the wireless backhaul device after the wireless backhaul device is handed over. It should be noted that the first network device and the second network device may be two base stations in a same core network, or may be two base stations in different core networks.

Figure 7:
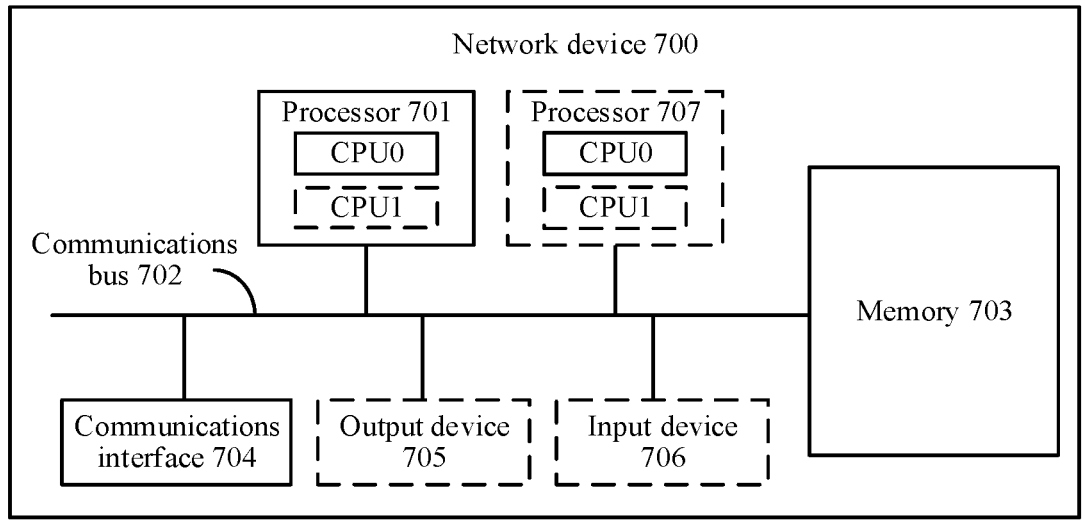
FIG. 7 is a schematic structural diagram of a network device according to an embodiment of this application.

A schematic diagram of a hardware structure of a network device is shown in FIG. 7. FIG. 7 is a schematic structural diagram of a network device 700. The network device 700 includes at least one processor 701, a communications bus 702, a memory 703, and at least one communications interface 704.

The processor 701 may be a general purpose central processing unit (CPU), a microprocessor, an application-specific integrated circuit (ASIC), or one or more integrated circuits configured to control program execution in the solutions in this application.

The communications bus 702 may include a channel, and transmits information between the foregoing components.

The communications interface 704 may be any apparatus such as a transceiver, and is configured to communicate with another device or a communications network, for example, an Ethernet, a RAN, or a WLAN.

The memory 703 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may alternatively be integrated with the processor.

The memory 703 is configured to store application program code for performing the solutions in this application, and the processor 701 controls the performing. The processor 701 is configured to execute the application program code stored in the memory 703, to implement the method provided in the following embodiments of this application.

In a specific implementation, in an embodiment, the processor 701 may include one or more CPUs, for example, a CPU 0 and a CPU 1 in FIG. 7.

In specific implementation, in an embodiment, the network device 700 may include a plurality of processors, for example, the processor 701 and a processor 707 in FIG. 7. Each of the processors may be a single-core processor, or may be a multi-core processor. The processor herein may refer to one or more devices, circuits, and/or processing cores configured to process data (for example, a computer program instruction).

In specific implementation, in an embodiment, the network device 700 may further include an output device 705 and an input device 707.

To facilitate understanding of the technical solutions of this application, related technologies in the embodiments of this application are first explained and described.

(1) Backhaul Link Resource Configuration in an LTE Relay Scenario

Figure 8:
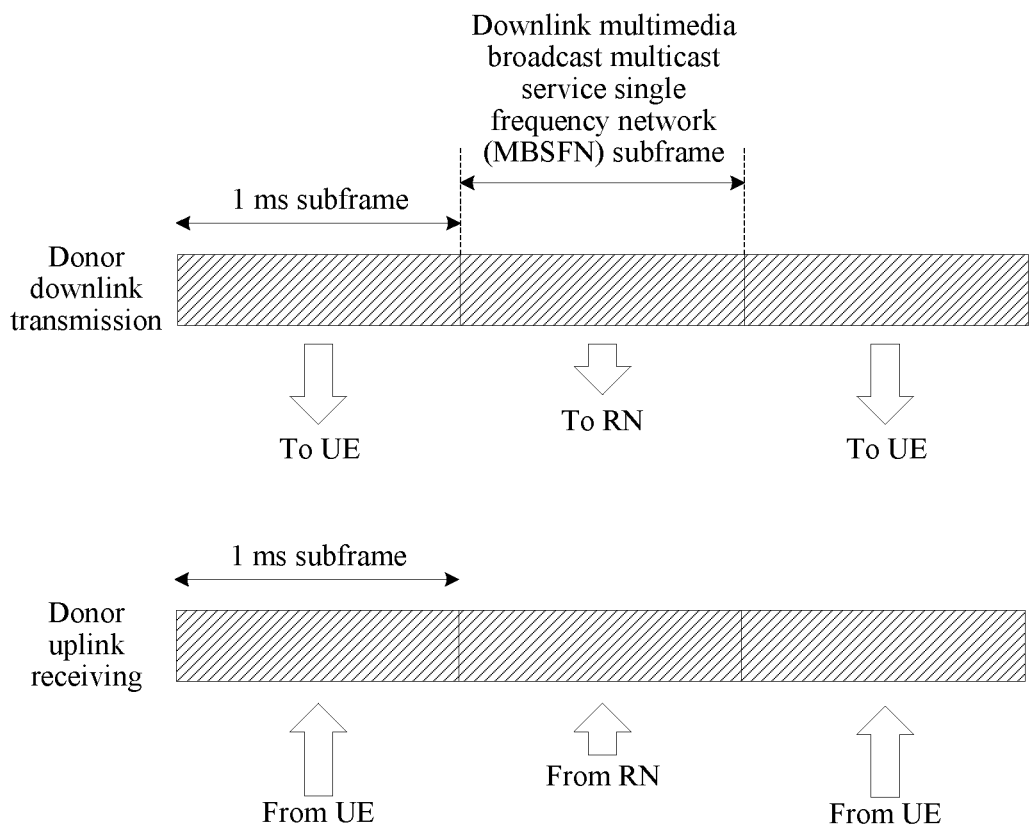
FIG. 8 is an example schematic diagram of a communications method according to an embodiment of this application.

Due to a limitation of half-duplexing, an RN cannot simultaneously receive data when sending data, and cannot simultaneously send data when receiving data, resulting in a sending and receiving conflict. To avoid the sending and receiving conflict, data transmission cannot be simultaneously performed on a backhaul link and an access link of the RN. To be specific, when sending data to a DeNB on the backhaul link, the RN cannot simultaneously receive data from a terminal side device on the access link. As shown in FIG. 8, data (namely, backhaul downlink data) sent by the DeNB to the RN on the backhaul link is transmitted in a predetermined downlink multicast broadcast single frequency network (MBSFN) subframe, and the downlink MBSFN subframe cannot be used for data transmission on the access link. Data (namely, backhaul uplink data) sent by the RN to the DeNB on the backhaul link is transmitted in a predetermined uplink subframe, and the uplink subframe cannot be used for data transmission on the access link. A part of non-shareable resources is separately allocated for uplink transmission and downlink transmission of the backhaul link, so that the receiving and sending conflict between the backhaul link and the access link can be avoided. However, according to this method, even if the allocated resource is not used on the backhaul link for data transmission, the part of resources cannot be used on the access link, and thus resource utilization is relatively low.

(2) Backhaul Link Resource Configuration in an NR System

In LTE, a terminal side device receives, through blind detection, a physical downlink control channel (PDCCH) that carries scheduling information, to transmit data based on the scheduling information. In a case of a bandwidth of 200 MHz, the terminal side device needs to perform the blind detection for a maximum of 44 times to determine whether there is the scheduling information required by the terminal side device.

In a case in which a bandwidth supported in the NR system increases, to reduce search complexity that exists when the terminal side device receives the PDCCH, search space of the PDCCH may be configured for the terminal side device. The search space of the PDCCH may be referred to as a control resource set (CORESET). The terminal side device may attempt to receive the PDCCH on a resource indicated by the received CORESET. The CORESET includes information such as a time-frequency resource location and a periodicity, and signaling used to configure the CORESET for the terminal side device may be a master information block (master information block, MIB) or radio resource control (RRC) signaling dedicated to the terminal side device.

A concept of integrated access and backhaul (IAB) is introduced in NR, to support resource sharing between an access link and a backhaul link.

To implement dynamic scheduling of a backhaul link resource, when an RN is handed over to another DgNB, the DgNB may use the RN as the terminal side device, and configure the CORESET for the RN. The RN may monitor the PDCCH on the resource indicated by the received CORESET, to obtain the scheduling information, and perform uplink data transmission through a physical uplink shared channel (PUSCH) based on the scheduling information, or perform downlink data transmission through a physical downlink shared channel (PDSCH) based on the scheduling information.

Similarly, the DgNB may further configure a CORESET of a control signal and/or a control channel for the RN. The control signal may be a downlink signal such as a channel state information reference signal (CSI-RS) or a tracking signal (TRS), an uplink signal such as a sounding reference signal (SRS), and an uplink channel such as a physical uplink control channel (PUCCH).

(3) Access Link Resource Configuration in the NR System

After receiving a backhaul link resource allocated by the DgNB to the RN, the RN may allocate an access link resource to a terminal served by the RN, so that the access link resource to be allocated to the terminal is staggered from the backhaul link resource of the RN. For example, the access link resource and the backhaul link resource may be staggered according to a method such as time-domain orthogonality or frequency-domain orthogonality. Optionally, the RN may send scheduling information to the terminal by using physical layer signaling, for example, downlink control information (DCI), transmitted through a PDCCH. The scheduling information indicates a PDSCH, and the PDSCH may notify a terminal side device of an available access link resource.

Figure 9:
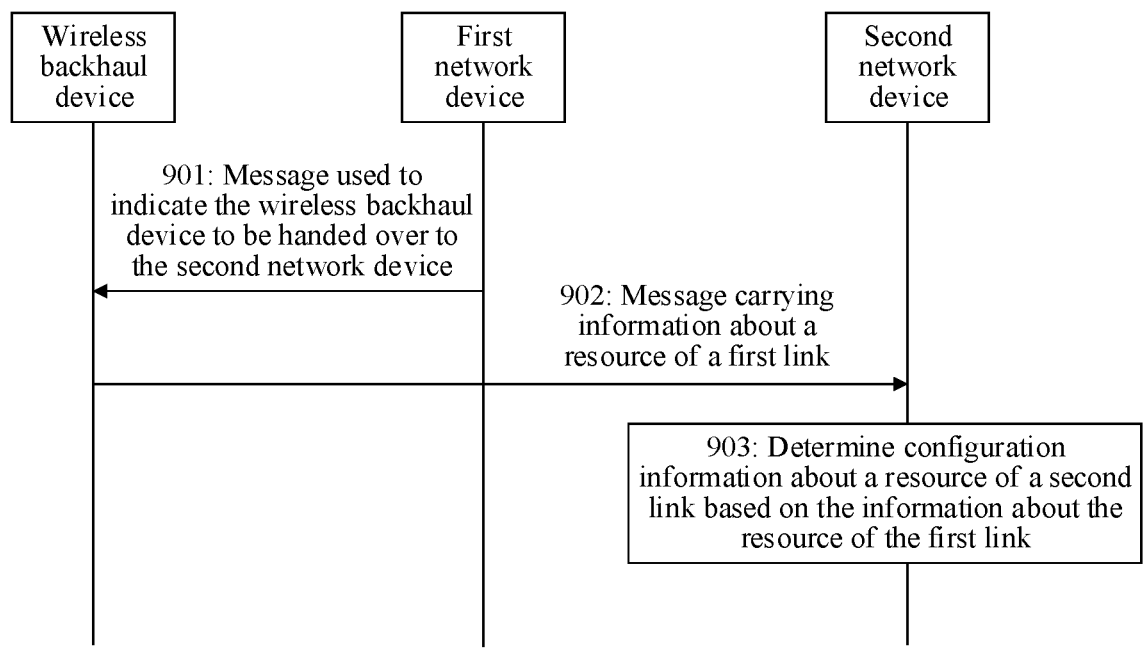
FIG. 9 is a flowchart of a communications method according to an embodiment of this application.

With reference to FIG. 4 to FIG. 8, an embodiment of this application provides a communications method. An interaction procedure between a wireless backhaul device, a first network device, and a second network device is used as an example for description. As shown in FIG. 9, the method specifically includes the following steps.

Step 901: The first network device sends, to the wireless backhaul device, a message used to indicate the wireless backhaul device to be handed over to the second network device. Correspondingly, the wireless backhaul device receives the message used to indicate the wireless backhaul device to be handed over to the second network device.

Optionally, the message may be an RRC connection reconfiguration message, where the RRC connection reconfiguration message includes a handover command, and the handover command is used to indicate the wireless backhaul device to be handed over to the second network device. The handover command includes an identifier of a target cell, for example, a physical cell identifier (PCI).

Step 902: The wireless backhaul device sends, to the second network device in a process in which the wireless backhaul device is handed over to the second network device or in a case in which the wireless backhaul device completes being handed over to the second network device, a message carrying information about a resource of a first link. Correspondingly, the second network device receives the message carrying the information about the resource of the first link.

The message carrying the information about the resource of the first link is used to notify the second network device that the wireless backhaul device has accessed the second network device. Optionally, the message carrying the information about the resource of the first link may be an RRC connection reconfiguration complete message sent by the wireless backhaul device based on an uplink transmission resource (an uplink transmission resource carried in a random access response message sent by the second network device to the wireless backhaul device) obtained in a random access process. Alternatively, the wireless backhaul device does not obtain an uplink transmission resource in a random access process, and the message carrying the information about the resource of the first link is a message sent by the wireless backhaul device by using an uplink transmission resource obtained in another manner, and may specifically be an RRC connection reconfiguration complete message. The uplink transmission resource obtained in another manner may be an uplink transmission resource preconfigured by the second network device, or may be an uplink transmission resource obtained by the wireless backhaul device by monitoring a PDCCH of the second network device (to be specific, by monitoring information that is about the uplink transmission resource and that is carried in the PDCCH).

The information about the resource of the first link is any one or more of a time domain resource, a frequency domain resource, a space domain resource, or a code domain resource that can be used by the wireless backhaul device on an access link. Alternatively, the information about the resource of the first link may be any one or more of a time domain resource, a frequency domain resource, a space domain resource, or a code domain resource of an access link between the wireless backhaul device and each terminal side device. For example, the time domain resource may be a subframe configuration, the frequency domain resource may be a frequency band or one or more radio resource groups, the space domain resource may be an antenna port, and the code domain resource may be one or more precoders in a precoding matrix.

The information about the resource of the first link may include control channel configuration information such as CORESET configuration information, and physical uplink control channel (PUCCH) configuration information, and reference signal configuration information such as CSI-SI configuration information, and sounding reference signal (SRS) configuration information.

Step 903: The second network device determines configuration information about a resource of a second link based on the information about the resource of the first link.

The second link is a communications link between the wireless backhaul device and the second network device.

Optionally, the second network device selects the resource of the second link from one or more resources other than the resource of the first link, and further determines the configuration information about the resource of the second link. In other words, when determining the configuration information about the resource of the second link, the second network device needs to avoid the resource that has been allocated by the wireless backhaul device to the first link.

According to the communications method provided in this embodiment of this application, the first network device may send, to the wireless backhaul device, the message used to indicate the wireless backhaul device to be handed over to the second network device. When leaving or being about to leave coverage of the first network device, the wireless backhaul device may be handed over to the second network device. In addition, the second wireless device may determine the configuration information about the resource of the second link based on the information about the resource of the first link. Further, because the second network device learns of the information about the resource of the first link, when allocating the resource of the second link, the second network device may refer to the resource that has been allocated by the wireless backhaul device to the first link. According to the method, the wireless backhaul device may be handed over to the second network device. In addition, a conflict between the to-be-allocated resource of the second link and the resource allocated by the wireless backhaul device to the first link can be avoided, and data transmission between the wireless backhaul device and a terminal side device can avoid being interrupted.

Figure 10:
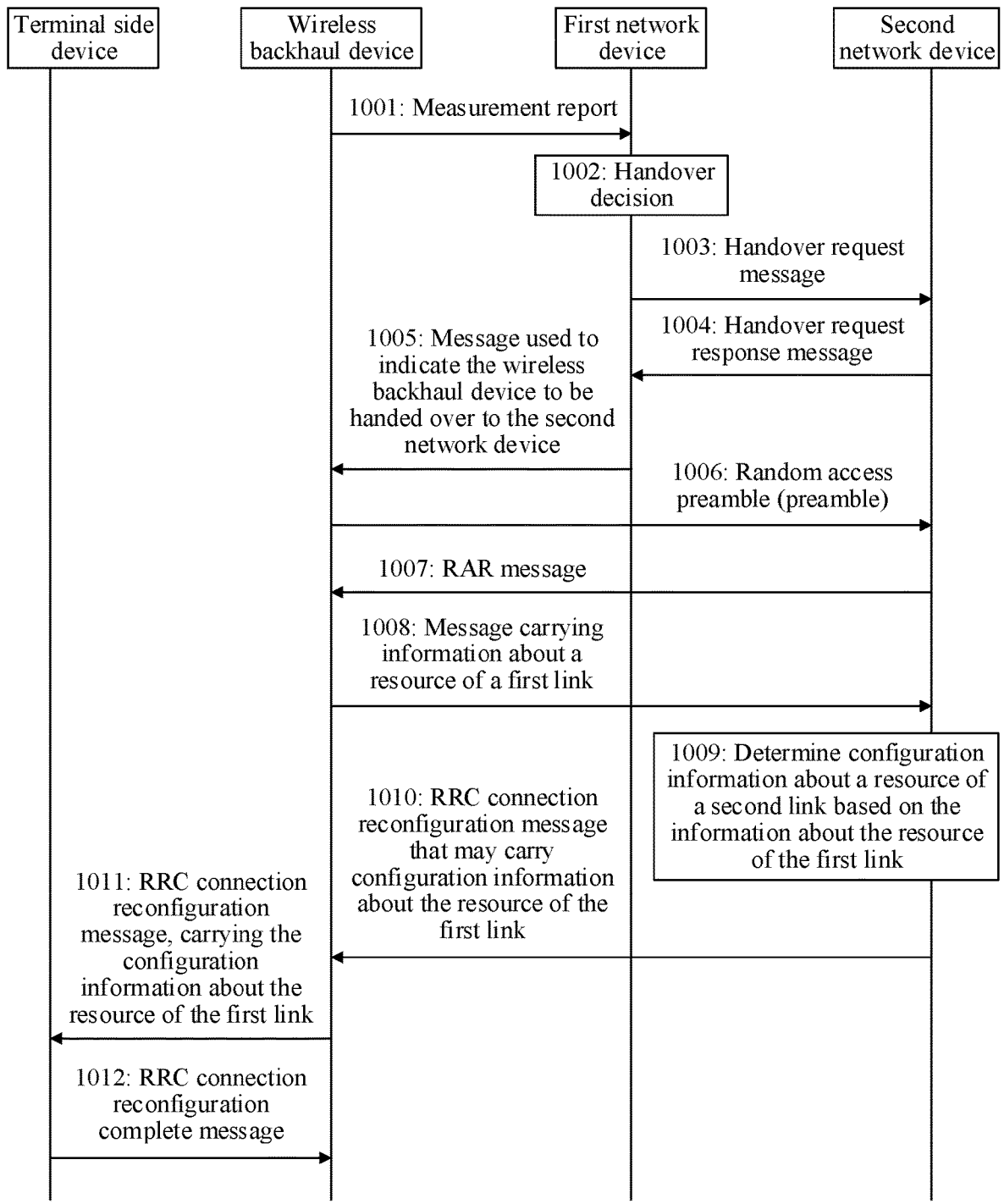
FIG. 10 is a flowchart of another communications method according to an embodiment of this application.

Based on the embodiment shown in FIG. 9, a method in which the wireless backhaul device is handed over from the first network device to the second network device is specifically described. As shown in FIG. 10, the method includes the following steps.

Step 1001: The wireless backhaul device sends a measurement report to the first network device. Correspondingly, the first network device receives the measurement report sent by the wireless backhaul device.

The measurement report is used to report a strength, for example, reference signal received power (RSRP), and reference signal received quality (RSRQ), of a measured signal that is of one or more network devices and that is received by the wireless backhaul device. Alternatively, the measurement report is used to report a strength relationship between strengths of measured signals of a plurality of network devices. For example, the measurement report of the wireless backhaul device indicates that the strength of the measured signal of another network device (for example, the second network device) other than the first network device is better than the strength of the measured signal of the first network device. A type of the measured signal is a cell-level measured signal such as a primary synchronization signal (PSS) or a secondary synchronization signal (SSS), or a user-level measured signal channel state information reference signal (CSI-RS).

Step 1002: The first network device makes a handover decision based on the measurement report.

The first network device may compare, based on the measurement report, a strength relationship between the signal strength of the measured signal that is of the first network device and that is received by the wireless backhaul device and the signal strength of the measured signal that is of the another network device other than the first network device and that is received by the wireless backhaul device. If the strength of the measured signal of the another network device (for example, the second network device) is higher than the signal strength of the first network device, the first network device may determine to hand over the wireless backhaul device to the second network device.

If the first network device determines to hand over the wireless backhaul device to another network device (for example, the second network device), subsequent steps continue to be performed.

Step 1003: The first network device sends a handover request message to the second network device. Correspondingly, the second network device receives the handover request message from the first network device.

It should be noted that the first network device may send the handover request message to a plurality of other network devices (including the second network device). After receiving the handover request message, the other network devices may perform access control, to be specific, determine whether the other network devices can provide a service for the wireless backhaul device. The second network device in this embodiment of this application is a network device that can provide the service for the wireless backhaul device, or may be understood as a target network device to which the wireless backhaul device is about to be handed over.

Step 1004: The second network device sends a handover request response message to the first network device. Correspondingly, the first network device receives the handover request response message sent by the second network device.

The handover request response message is used to notify the first network device that the wireless backhaul device may be handed over to the second network device.

Step 1005 is the same as step 901. For details, refer to the descriptions in step 901. Details are not described herein again.

Optionally, a message in step 1005 may further indicate an uplink transmission resource that is available when the wireless backhaul device communicates with the second network device.

It may be understood that, upon receiving the message in step 1005, the wireless backhaul device may be handed over to the second network device. A process in which the wireless backhaul device is handed over to the second network device may include a random access process or not include a random access process. If the random access process is included, step 1006 is performed after step 1005. If the wireless backhaul device has been pre-configured with an uplink transmission resource (for example, the uplink transmission resource indicated in step 1005) that is available when the wireless backhaul device communicates with the second network device, or the wireless backhaul device has obtained an uplink transmission resource by monitoring the PDCCH of the second network device, the process in which the wireless backhaul device is handed over to the second network device may not include the random access process, and step 1008 is directly performed after step 1005.

Step 1006: The wireless backhaul device sends a random access preamble to the second network device. Correspondingly, the second network device receives the random access preamble sent by the wireless backhaul device.

Step 1007: The second network device sends a random access response (RAR) to the wireless backhaul device. Correspondingly, the wireless backhaul device receives the RAR from the second network device.

The RAR carries information about the uplink transmission resource, and the information about the uplink transmission resource is used to indicate the uplink transmission resource that is available for communication between the wireless backhaul device and the second network device.

Step 1008 and step 1009 are the same as step 902 and step 903. For details, refer to related descriptions in step 902 and step 903.

It should be noted that, in step 1009, when the second network device determines the configuration information about the resource of the second link based on the information about the resource of the first link, the following two possible implementations are included but are not limited thereto.

Manner 1 is the same as the descriptions in step 903. To be specific, the second network device selects the resource of the second link from resources except the resource of the first link, and further determines the configuration information about the resource of the second link.

Manner 2: The second network device first determines the configuration information about the resource of the second link.

Optionally, when determining the configuration information about the resource of the second link, the second network device may refer to the resource of the first link, so that the resource of the second link avoids the resource of the first link as much as possible, and if the avoidance fails, a quantity of terminal side devices that are affected is reduced as much as possible. Further, if the configuration information that is about the resource of the second link and that is determined by the second network device conflicts with the resource of the first link, the second network device adjusts, based on the configuration information about the resource of the second link, the resource allocated to the first link, or it may also be understood as that the second network device generates configuration information about the resource of the first link. It may be understood that, in the manner 2, the second network device needs to avoid the resource of the second link when generating the configuration information about the resource of the first link.

Step 1010: The second network device sends an RRC connection reconfiguration message to the wireless backhaul device. Correspondingly, the wireless backhaul device receives the RRC connection reconfiguration message from the second network device.

In the manner 1, the RRC connection reconfiguration message sent by the second network device to the wireless backhaul device carries the configuration information about the resource of the second link.

Optionally, the RRC connection reconfiguration message in step 1010 may not carry the configuration information about the resource of the first link, and the second network device may send another RRC connection reconfiguration message to the wireless backhaul device after step 1010, where the another RRC connection reconfiguration message carries the configuration information about the resource of the second link.

In the manner 2, the RRC connection reconfiguration message sent by the second network device to the wireless backhaul device carries the configuration information about the resource of the first link. Optionally, the RRC connection reconfiguration message further carries the configuration information about the resource of the second link.

Optionally, the RRC connection reconfiguration message in step 1010 may not carry the configuration information about the resource of the first link, and the second network device may send another RRC connection reconfiguration message to the wireless backhaul device after step 1010, where the another RRC connection reconfiguration message carries the configuration information about the resource of the first link. Optionally, the another RRC connection reconfiguration message may further carry the configuration information about the resource of the second link.

It should be noted that, when receiving the configuration information about the resource of the first link, the wireless backhaul device may use the configuration information about the resource of the first link, or the wireless backhaul device may regenerate configuration information about the resource of the first link with reference to the received configuration information about the resource of the first link.

Step 1011: The wireless backhaul device sends an RRC connection reconfiguration message to the terminal side device, and correspondingly, the terminal side device receives the RRC connection reconfiguration message sent by the wireless backhaul device.

The RRC connection reconfiguration message sent by the wireless backhaul device to the terminal side device includes the configuration information about the resource of the first link, where the configuration information about the resource of the first link may be the configuration information that is about the resource of the first link and that is sent by the second network device to the wireless backhaul device, or may be the configuration information that is about the resource of the first link and that is regenerated by the wireless backhaul device based on the configuration information that is about the resource of the first link and that is received by the wireless backhaul device.

It may be understood that after receiving the configuration information about the resource of the first link, the terminal side device may subsequently communicate with the wireless backhaul device by using a resource indicated by the configuration information about the resource of the first link.

Step 1012: The terminal side device sends an RRC connection reconfiguration complete message to the wireless backhaul device. Correspondingly, the wireless backhaul device receives the RRC connection reconfiguration complete message sent by the terminal side device.

According to the communications method provided in this embodiment of this application, in the process in which the wireless backhaul device is handed over from the first network device to the second network device, the wireless backhaul device may send the information about the resource of the first link to the second network device. In a possible implementation, when determining the configuration information about the resource of the second link, the second network device may avoid the resource that has been allocated by the wireless backhaul device to the first link, to avoid the conflict between the to-be-allocated resource of the second link and the resource that has been allocated by the wireless backhaul device to the first link, thereby avoiding interruption of transmission between the wireless backhaul device and the terminal side device. Alternatively, in another possible implementation, when determining the configuration information about the resource of the second link, the second network device may refer to the information about the resource of the first link, to reduce as much as possible the quantity of terminal side devices that are affected, so that a quantity of terminal side devices on which resource reconfiguration needs to be performed can be reduced, and signaling overheads generated when the resource of the first link is reconfigured for the terminal side device can be reduced.

Figure 11:
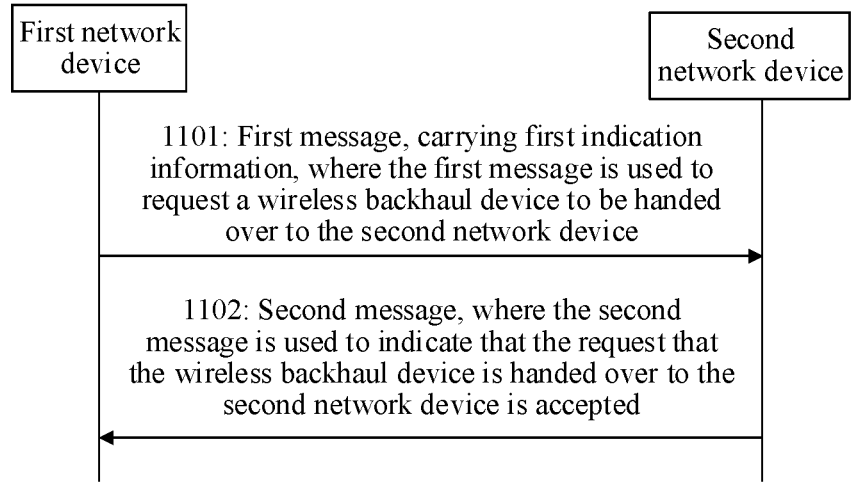
FIG. 11 is a flowchart of another communications method according to an embodiment of this application.

With reference to FIG. 4 to FIG. 8, an embodiment of this application further provides another communications method. As shown in FIG. 11, the method includes the following steps.

Step 1101: A first network device sends a first message to a second network device. Correspondingly, the second network device receives the first message sent by the first network device.

The first message is used to request to hand over the wireless backhaul device to the second network device. For example, the first message may be a handover request message.

It should be noted that the first network device may send the first message to a plurality of other network devices (including the second network device). After receiving the handover request message, the other network devices may determine whether the other network devices can provide a service for the wireless backhaul device, and the second network device is a network device that can provide the service for the wireless backhaul device, or it may also be understood as that the second network device is a target network device to which the wireless backhaul device is handed over.

The first message carries first indication information, and the first indication information may be one of the following three cases.

Case 1: The first indication information includes information about a resource that is of a first link and that is configured by the wireless backhaul device.

The information about the resource that is of the first link and that is configured by the wireless backhaul device is the same as the information about the resource of the first link in step 902. Related descriptions in step 902 may be made reference to, and details are not described herein again.

It may be understood that before sending, to the second network device, configuration information about the resource that is of the first link and that is configured by the wireless backhaul device, the first network device needs to obtain the configuration information about the resource that is of the first link and that is configured by the wireless backhaul device. There may be the following four obtaining methods.

(1) Before sending the first message to the second network device, the first network device sends, to the wireless backhaul device, a message (which may be a newly defined RRC message) used to request to obtain the information about the resource of the first link, and then the wireless backhaul device sends the information about the resource of the first link to the first network device. Correspondingly, the first network device receives the information that is about the resource and that is sent on the first link.

(2) The wireless backhaul device sends a measurement report to the first network device, where the measurement report includes the configuration information about the resource of the first link. Correspondingly, the first network device receives the measurement report sent by the wireless backhaul device, and obtains the configuration information about the resource of the first link from the measurement report. The measurement report is used to provide a measurement result to the first network device. The measurement result includes a strength that is of a measured signal, such as RSRP or RSRQ, of one or more other network devices and that is received by the wireless backhaul device. Alternatively, the measurement result includes a strength relationship between strengths of measured signals of a plurality of network devices. For example, the measurement report of the wireless backhaul device indicates that the strength of the measured signal of the second or another network device is higher than the strength of the measured signal of the first network device.

(3) The wireless backhaul device sends a downlink data sending status report to the first network device, where the downlink data sending status report includes the information about the resource of the first link. Correspondingly, the first network device receives the downlink data sending status report sent by the wireless backhaul device, and obtains the information about the resource of the first link from the downlink data sending status report. The downlink data sending status report is used to notify the wireless backhaul device of a downlink data transmission status, for example, notify the wireless backhaul device of a sequence number of a data packet that has been successfully transmitted. The downlink data sending status report may further provide a downlink buffer status of the wireless backhaul device or an amount of buffered data of the wireless backhaul device, that is, a buffer status of an access link. The first network device may adjust resource allocation or scheduling on the access link based on the downlink data sending status report. For example, when an amount of downlink buffered data of the wireless backhaul device is excessively high, scheduling of the wireless backhaul device on a backhaul link can be reduced. Optionally, the first network device may request the wireless backhaul device to send the downlink data sending status report, or the wireless backhaul device may actively send the downlink data sending status report to the first network device.

(4) When initially accessing the first network device, the wireless backhaul device reports the configuration information about the resource of the first link to the first network device. Alternatively, before the first network device sends the first message to the second network device, the wireless backhaul device reports the configuration information about the resource of the first link to the first network device when performing resource negotiation with the first network device.

Case 2: The first indication information is information about a resource that is of a third link and that is configured by the first network device.

The third link is a communications link between the first network device and the wireless backhaul device.

Optionally, the wireless backhaul device may send the information about the resource of the first link to the first network device, so that the first network device may determine, based on the information about the resource of the first link, the resource that is of the third link and that can be scheduled by the first network device to the wireless backhaul device. The information about the resource of the third link is used to indicate the resource of the third link.

Case 3: The first indication information is information about a resource that is of a first link and that is configured by the first network device.

It should be noted that, different from case 1, in case 3, the resource of the first link between the wireless backhaul device and a terminal side device is not independently determined by the wireless backhaul device, and is instead allocated by the first network device. For example, after the wireless backhaul device accesses the first network device, the first network device may configure the resource of the first link. Alternatively, when the wireless backhaul device performs resource negotiation with the first network device, the first network device determines and configures the resource of the first link.

Step 1102: The second network device sends a second message to the first network device, where the second message is used to indicate that the request for handing over the wireless backhaul device to the second network device is accepted. Correspondingly, the first network device receives the second message sent by the second network device.

It may be understood that if the first message is the handover request message, the second message is a handover request response message.

According to the communications method provided in this embodiment of this application, the first network device may send the first message to the second network device, to request to hand over the wireless backhaul device to the second network device, and then the second network device may return the second message in response to the request of the first network device that the wireless backhaul device may be handed over to the second network device, so that the wireless backhaul device can be handed over to the second network device. In addition, the first message carries the first indication information, so that the second network device can refer to the first indication information when determining a resource of a second link, thereby avoiding a conflict between the resource of the second link and the resource of the first link, and avoiding interruption of data transmission between the wireless backhaul device and the terminal side device.

Figure 12:
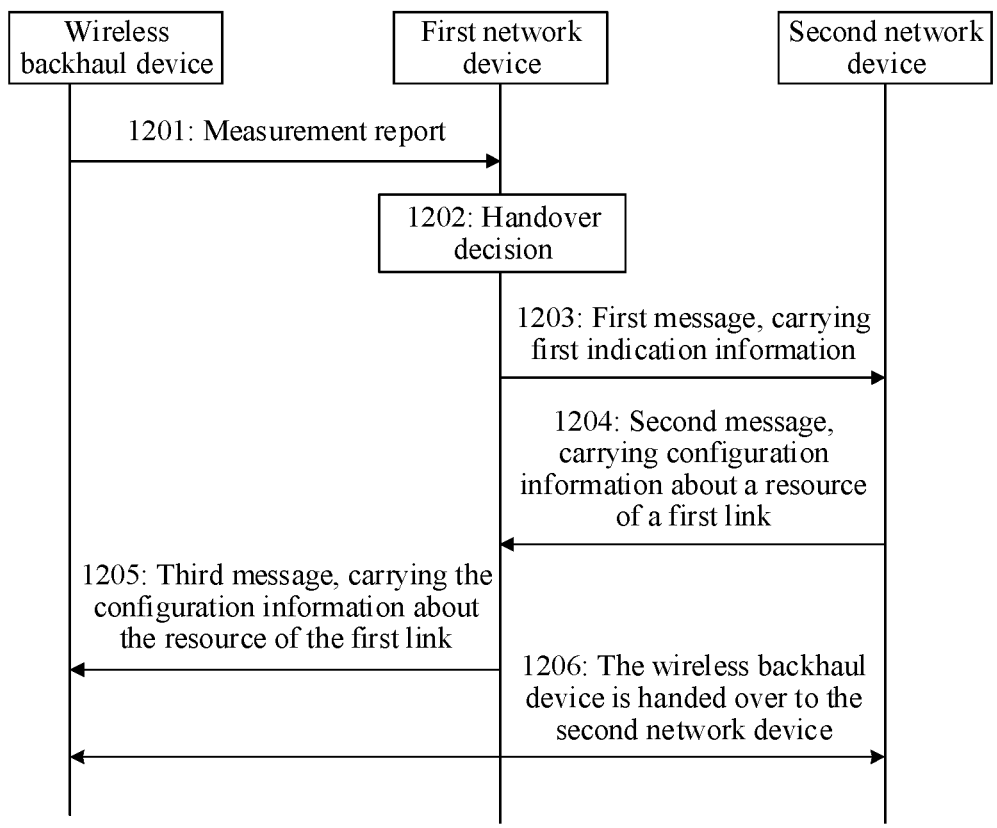
FIG. 12 is a flowchart of another communications method according to an embodiment of this application.

Based on the embodiment shown in FIG. 11, a method in which the wireless backhaul device is handed over from the first network device to the second network device is specifically described. As shown in FIG. 12, the method includes the following steps.

Step 1201: The wireless backhaul device sends the measurement report to the first network device. Correspondingly, the first network device receives the measurement report sent by the wireless backhaul device.

Step 1202: The first network device makes a handover decision based on the measurement report.

If the first network device determines to hand over the wireless backhaul device to another network device (for example, the second network device), subsequent steps continue to be performed.

Step 1203 and step 1204 are the same as step 1101 and step 1102, and details are not described herein again.

Before sending the second message to the first network device in step 1204, the second network device may determine the configuration information about the resource of the second link based on the first indication information. The second link is a backhaul link between the second network device and the wireless backhaul device.

Optionally, corresponding to the case 1, if the first indication information includes the information about the resource that is of the first link and that is configured by the wireless backhaul device, for a method in which the second network device determines the configuration information about the resource of the second link, refer to the manner 1 or the manner 2 in step 1009.

Corresponding to the case 2, if the first indication information is the information about the resource that is of the third link and that is configured by the first network device, the second network device may determine the configuration information about the resource of the second link with reference to the information about the resource of the third link. Because the resource of the third link has avoided the resource of the first link, the second network device determines the configuration information about the resource of the second link based on the information about the resource of the third link, so that the resource to be allocated to the second link avoids the resource of the first link.

Alternatively, when determining the configuration information about the resource of the second link, the second network device may refer to the resource of the third link, so that the resource of the second link avoids the resource of the first link as much as possible, and if the avoidance fails, a quantity of terminal side devices that are affected is reduced as much as possible. Further, if the resource that is of the second link and that is determined by the second network device conflicts with the resource of the first link, the second network device adjusts, based on the configuration information about the resource of the second link, the resource allocated to the first link, or it may also be understood as that the second network device generates the configuration information about the resource of the first link, and needs to avoid the resource of the second link when generating the configuration information about the resource of the first link.

Corresponding to the case 3, if the first indication information is the information about the resource that is of the first link and that is configured by the first network device, for a method in which the second network device determines the configuration information about the resource of the second link, refer to the manner 1 or the manner 2 in step 1009.

If the second network device generates the configuration information about the resource of the first link, the second message carries the configuration information about the resource of the first link. Optionally, the second message may further carry the configuration information that is about the resource of the second link and that is generated by the second network device.

It should be noted that, when receiving the configuration information about the resource of the first link, the wireless backhaul device may use the configuration information about the resource of the first link, or the wireless backhaul device may regenerate configuration information about the resource of the first link with reference to the received configuration information about the resource of the first link.

Step 1205: The first network device sends a third message to the wireless backhaul device. Correspondingly, the wireless backhaul device receives the third message sent by the first network device.

The third message is used to indicate the wireless backhaul device to be handed over to the second network device. Optionally, the third message may be an RRC connection reconfiguration message.

Optionally, if the second message received by the first network device in step 1204 carries the configuration information about the resource of the first link, the third message sent by the first network device to the wireless backhaul device also carries the configuration information about the resource of the first link. The configuration information about the resource of the first link may be the configuration information that is about the resource of the first link and that is sent by the second network device to the wireless backhaul device, or may be configuration information that is about the resource of the first link and that is regenerated by the wireless backhaul device based on the configuration information that is about the resource of the first link and that is received by the wireless backhaul device.

Step 1206: The wireless backhaul device is handed over to the second network device.

Optionally, based on the embodiment shown in FIG. 12, if the third message in step 1205 carries reconfiguration information about the resource of the first link, the wireless backhaul device may reconfigure the terminal side device based on the configuration information about the resource of the first link after step 1205.

Figure 13:
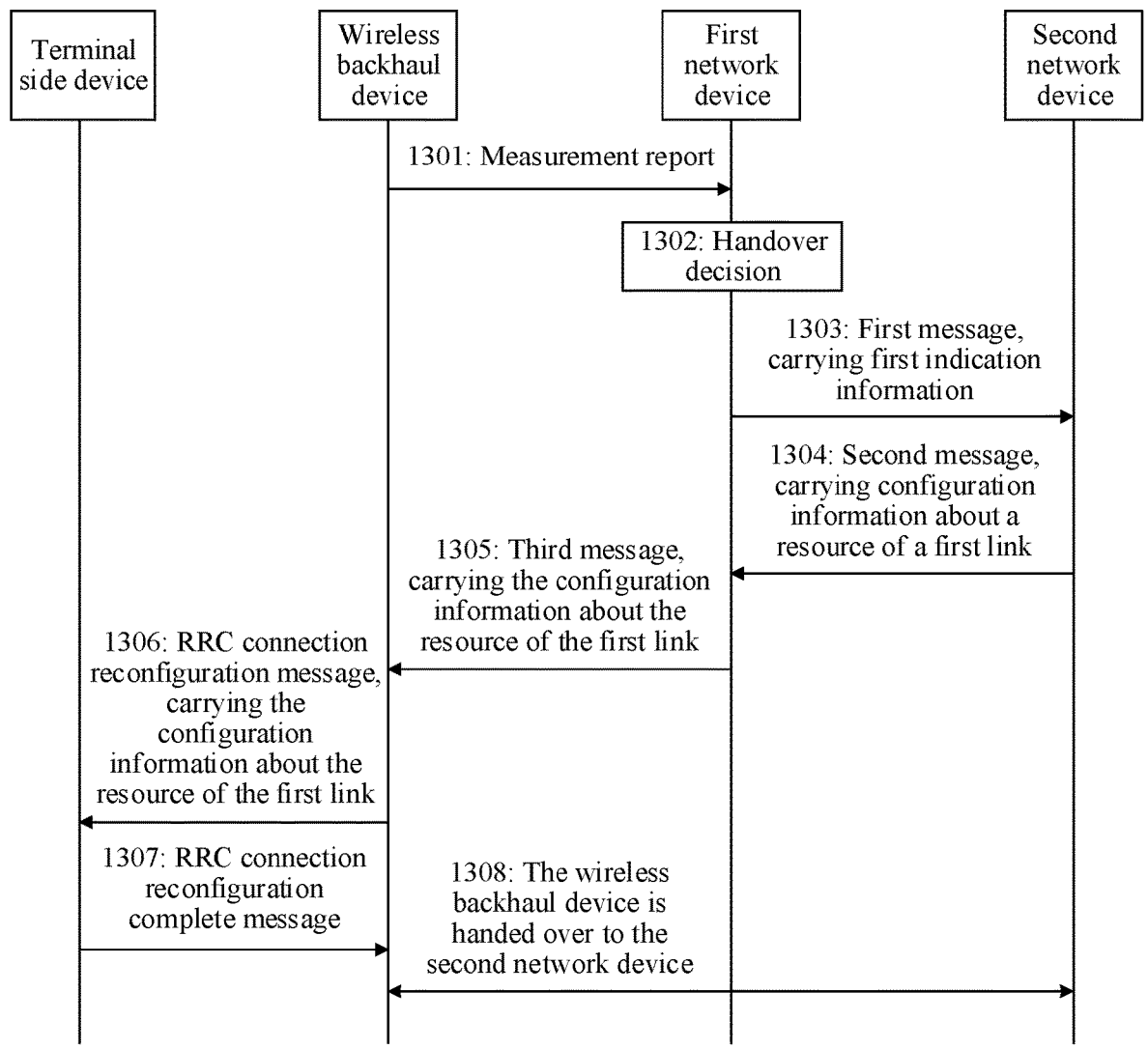
FIG. 13 is a flowchart of another communications method according to an embodiment of this application.

In a first possible implementation, after receiving the configuration information about the resource of the first link, the wireless backhaul device may first perform resource reconfiguration on the terminal side device, and then perform step 1206. Specifically, as shown in FIG. 13, step 1301 to step 1308 are included.

Step 1301 to step 1305 are similar to step 1201 to step 1205, and reference may be made to related descriptions in step 1201 to step 1205. In addition, in an embodiment in FIG. 13, a case in which the third message received by the wireless backhaul device in step 1305 carries the configuration information about the resource of the first link is described.

Step 1306: The wireless backhaul device sends an RRC connection reconfiguration message to the terminal side device, and correspondingly, the terminal side device receives the RRC connection reconfiguration message from the wireless backhaul device.

The RRC connection reconfiguration message includes the configuration information about the resource of the first link. It may be understood that after receiving the configuration information about the resource of the first link, the terminal side device may subsequently communicate with the wireless backhaul device by using a resource indicated by the configuration information about the resource of the first link.

Step 1307: The terminal side device sends an RRC connection reconfiguration complete message to the wireless backhaul device.

Step 1308 is the same as step 1206, and details are not described herein again.

According to the method, the wireless backhaul device may complete resource reconfiguration on the terminal side device before being handed over to the second network device. After the wireless backhaul device is handed over, the terminal side device may already communicate with the wireless backhaul device by using the resource indicated by the configuration information about the resource of the first link. Because the configuration information about the resource of the second link and the configuration information about the resource of the first link are staggered, a case in which the resource of the first link conflicts with the resource of the second link does not occur after the wireless backhaul device is handed over, and a problem of the data transmission interruption caused by the resource conflict can be avoided.

Figure 14:
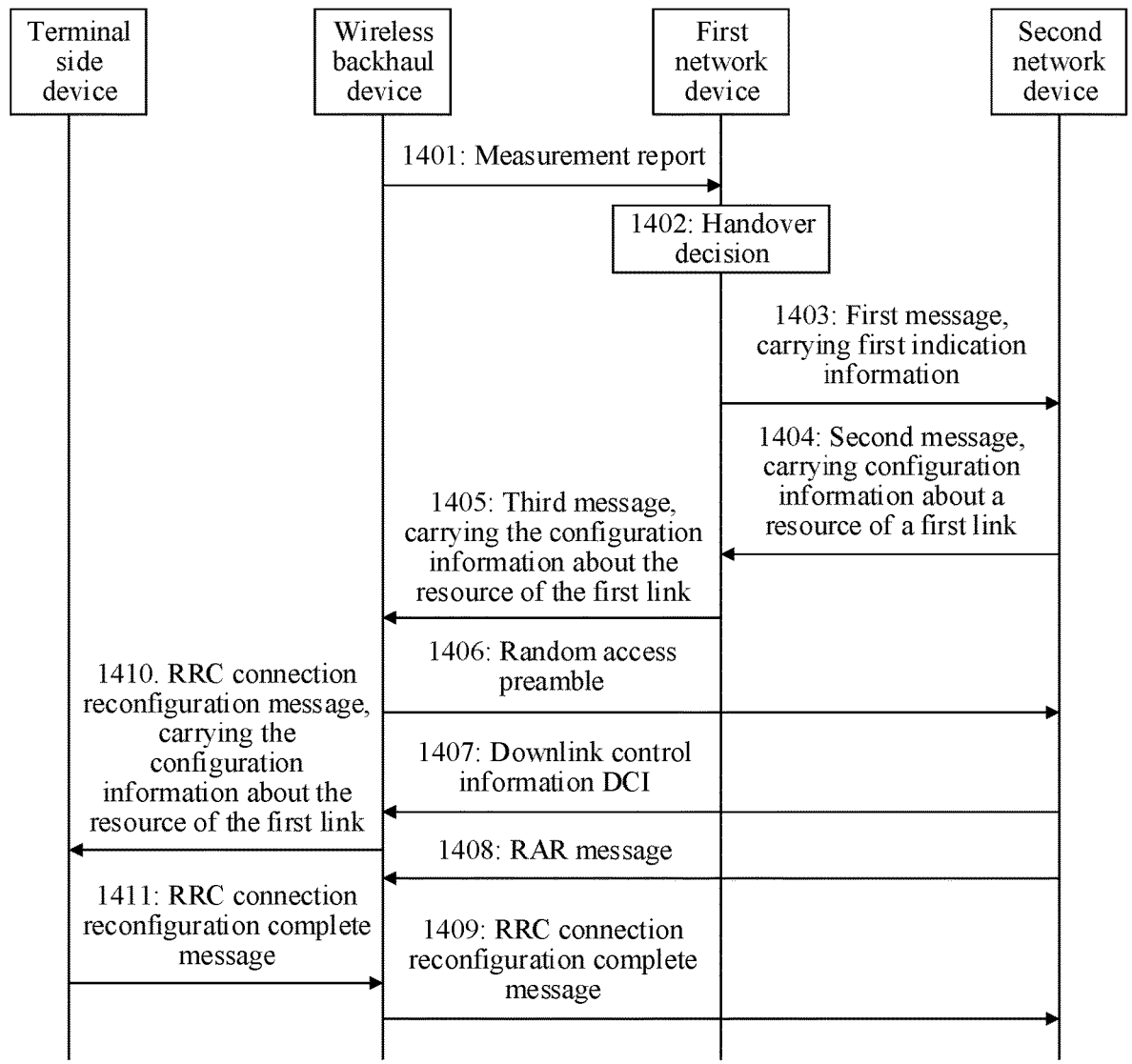
FIG. 14 is a flowchart of another communications method according to an embodiment of this application.

In a second possible implementation, after receiving the configuration information about the resource of the first link, the wireless backhaul device may perform resource reconfiguration on the terminal side device in an execution process of step 1206 in which the wireless backhaul device is handed over to the second network device. Specifically, as shown in FIG. 14, step 1401 to step 1411 are included.

Step 1401 to step 1405 are similar to step 1201 to step 1205, and reference may be made to related descriptions in step 1201 to step 1205. A difference lies in that in an embodiment corresponding to FIG. 14, a case in which the third message received by the wireless backhaul device in step 1405 carries the configuration information about the resource of the first link is described.

It should be noted that, to ensure that the step in which the wireless backhaul device is handed over to the second network device is performed synchronously with a process in which the wireless backhaul device performs resource reconfiguration on the terminal side device. To avoid a conflict between a process in which the wireless backhaul device is handed over to the second network device on the second link and a resource used in the process in which the wireless backhaul device performs resource reconfiguration on the terminal side device on the first link. A CORESET used for communication between the second network device and the wireless backhaul device and a CORESET used for communication between the wireless backhaul device and the terminal side device may be different. This application provides two methods to avoid the conflict.

Method 1: In step 1403, the first message (the handover request message) sent by the first network device to the second network device further carries second indication information, where the second indication information is used to indicate the resource of the second link, and the resource of the second link is a resource that is available when the wireless backhaul device detects a PDCCH sent by the second network device.

In other words, the second indication information may also be referred to as a CORESET configured by the first network device for the wireless backhaul device, that is, search space that is of the PDCCH and that is configured by the first network device for the wireless backhaul device.

It may be understood that, before the wireless backhaul device is handed over to the second network device, the CORESET configured by the first network device for the wireless backhaul device is staggered from the CORESET configured by the wireless backhaul device for the terminal side device. Therefore, if the wireless backhaul device continues to be handed over to the second network device based on the CORESET configured by the first network device for the wireless backhaul device, the resource used in the process in which the wireless backhaul device performs resource reconfiguration on the terminal side device does not conflict with a resource used by the second network device for performing handover execution based on the CORESET configured by the first network device for the wireless backhaul device.

It should be noted that the resource that is of the second link and that is indicated by the second indication information configured by the first network device is a resource that is available when the wireless backhaul device detects a PDCCH sent by the first network device. After receiving the CORESET configured by the first network device for the wireless backhaul device, the second network device may use the CORESET configured by the first network device for the wireless backhaul device. That is, in this case, the resource that is of the second link and that is indicated by the CORESET is the resource that is available when the wireless backhaul device detects the PDCCH sent by the second network device. Alternatively, the second network device may reconfigure a CORESET for the wireless backhaul device without referring to the CORESET configured by the first network device for the wireless backhaul device.

Method 2: In step 1404, the second message (the handover request response message) sent by the second network device to the first network device carries third indication information, where the third indication information is used to indicate the resource of the second link, and the resource of the second link is a resource that is available when the wireless backhaul device detects a PDCCH sent by the second network device.

The third indication information may be referred to as a CORESET configured by the second network device for the wireless backhaul device, that is, search space that is of the PDCCH and that is configured by the second network device for the wireless backhaul device.

Optionally, according to the method 2, in step 1405, the third message sent by the first network device to the wireless backhaul device also includes the CORESET configured by the second network device for the wireless backhaul device.

Step 1406: The wireless backhaul device sends a random access preamble to the second network device, and correspondingly, the second network device receives the random access preamble sent by the wireless backhaul device.

Step 1407: The second network device sends downlink control information (DCI) to the wireless backhaul device, and correspondingly, the wireless backhaul device receives the DCI from the second network device.

Corresponding to the foregoing method 1, the second network device may determine, based on the CORESET configured by the first network device for the wireless backhaul device, a resource for sending the DCI. Corresponding to the foregoing method 2, the second network device may determine, based on the CORESET configured by the second network device for the wireless backhaul device, a resource for sending the DCI.

The DCI may indicate a PDSCH carrying the RAR. After receiving the DCI, the wireless backhaul device may receive the RAR through the PDSCH indicated by the DCI.

Step 1408: The second network device sends an RAR message to the wireless backhaul device, and correspondingly, the wireless backhaul device receives the RAR message sent by the second network device.

Corresponding to the foregoing method 1, the second network device may send the DCI based on the CORESET configured by the first network device for the wireless backhaul device, where the DCI indicates the PDSCH carrying the RAR, so that a resource such as the CORESET or the PDSCH that are used when the second network device communicates with the wireless backhaul device on the backhaul link are staggered from a resource used when the wireless backhaul device communicates with the terminal side device on the access link. In addition, the wireless backhaul device does not need to monitor the RAR in an entire RAR time window, and may monitor the PDCCH based on the CORESET to obtain the DCI, and receive the RAR on the PDSCH indicated by the DCI. Corresponding to the foregoing method 2, the second network device may send the DCI based on the CORESET configured by the second network device for the wireless backhaul device, where the DCI indicates the PDSCH carrying the RAR.

It may be understood that the second network device may schedule the PDSCH indicated by the DCI in step 1407 for sending the RAR.

Step 1409: The wireless backhaul device sends an RRC connection reconfiguration complete message to the second network device. Correspondingly, the second network device receives the RRC connection reconfiguration complete message sent by the wireless backhaul device.

Step 1410: The wireless backhaul device sends an RRC connection reconfiguration message to the terminal side device, and correspondingly, the terminal side device receives the RRC connection reconfiguration message sent by the wireless backhaul device.

The RRC connection reconfiguration message includes the configuration information about the resource of the first link.

Optionally, step 1410 may be performed before step 1406, or may be performed between step 1407 and step 1408. If not receiving the CORESET configured by the second network device for the wireless backhaul device, the wireless backhaul device may determine, with reference to the CORESET configured by the first network device for the wireless backhaul device, a resource used for sending a message to the terminal side device; for example, the wireless backhaul device schedules a PDSCH that is staggered from the CORESET and that is for sending the RRC connection reconfiguration message to the terminal side device. If receiving the CORESET configured by the second network device for the wireless backhaul device, the wireless backhaul device may determine, based on the CORESET configured by the second network device for the wireless backhaul device, a resource used for sending a message to the terminal; for example, the wireless backhaul device schedules a PDSCH that is staggered from the CORESET and that is for sending the RRC connection reconfiguration message to the terminal side device.

Step 1411: The terminal side device sends an RRC connection reconfiguration complete message to the wireless backhaul device. Correspondingly, the wireless backhaul device receives the RRC connection reconfiguration complete message sent by the terminal side device.

Optionally, after receiving the RRC connection reconfiguration message sent by the wireless backhaul device, the terminal side device may send the RRC connection reconfiguration complete message to the wireless backhaul device based on scheduling of the wireless backhaul device. Step 1411 may be performed between step 1406 and step 1409, or may be performed after step 1409.

According to the resource configuration method provided in the embodiments of this application, when generating the configuration information about the resource of the first link, the second network device may perform a handover of the wireless backhaul device to the second network device based on the CORESET of the first network device, and may also perform resource reconfiguration on the terminal side device. Because the CORESET of the first network device is staggered from the CORESET configured by the wireless backhaul device for the terminal side device, the wireless backhaul device is handed over by the second network device based on the CORESET configured by the first network device for the wireless backhaul device; for example, the second network device sends the DCI for scheduling the PDSCH, where the PDSCH includes the RAR, and the resource used in the process in which the wireless backhaul device performs resource reconfiguration on the terminal side device does not conflict with a resource used by the second network device for performing handover execution based on the CORESET configured by the first network device for the wireless backhaul device. Similarly, when the wireless backhaul device learns of the CORESET configured by the second network device for the wireless backhaul device, the resource used in the process in which the wireless backhaul device performs resource reconfiguration on the terminal side device does not conflict with the resource used by the second network device for performing handover execution based on the CORESET configured by the second network device for the wireless backhaul device. Therefore, the process in which the wireless backhaul device is handed over to the second network device may be performed synchronously with the process in which the wireless backhaul device performs resource reconfiguration on the terminal side device, to avoid a phenomenon that exists after the handover is completed and that data transmission between the terminal side device and the wireless backhaul device is interrupted because of a delay introduced in a process of performing resource reconfiguration on the terminal side device.

Figure 15:
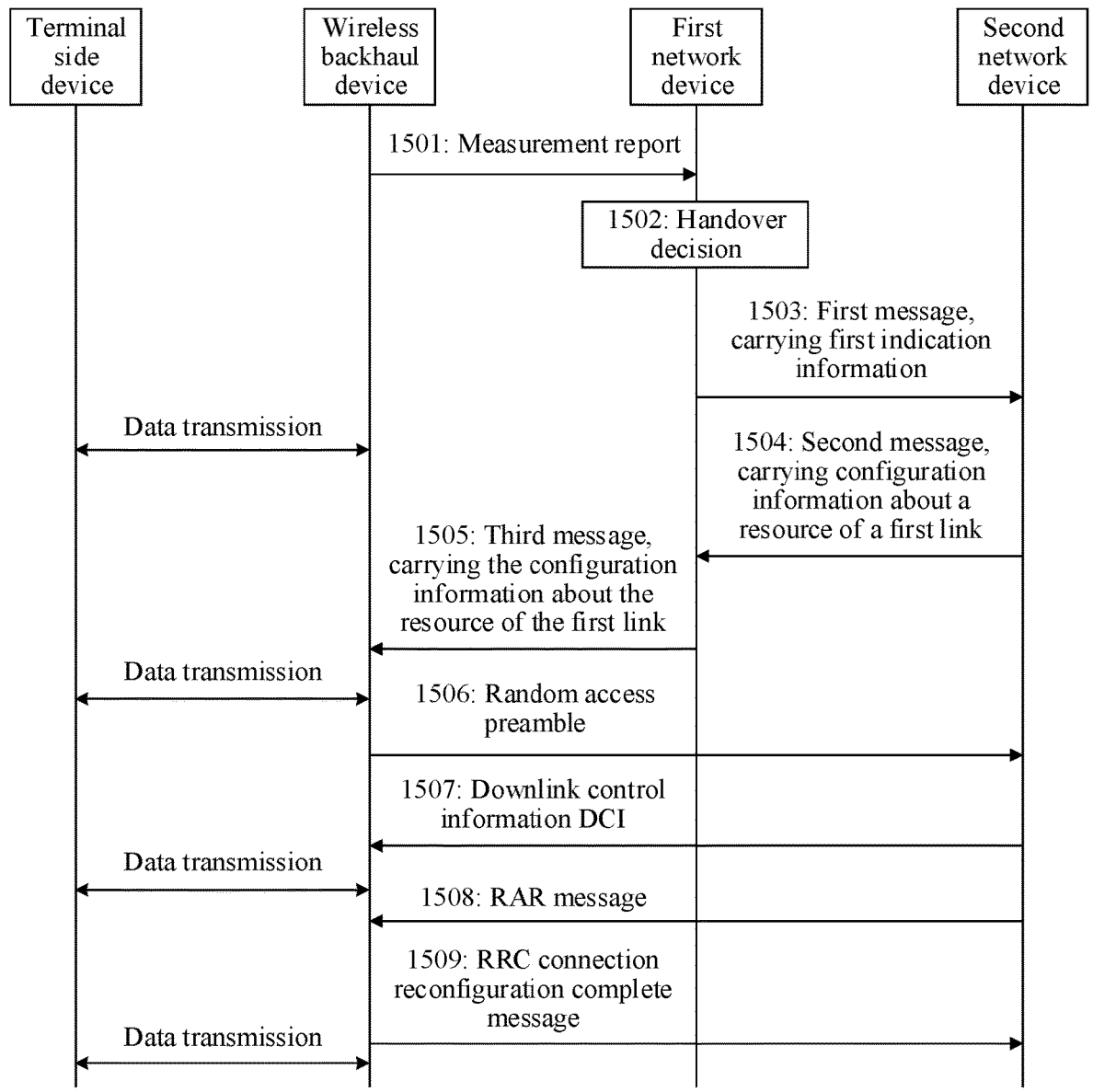
FIG. 15 is a flowchart of another communications method according to an embodiment of this application.

It should be noted that the foregoing embodiments mainly describe signaling plane transmission in the handover process of the wireless backhaul device. In the embodiment corresponding to FIG. 14, for a terminal side device that does not need resource reconfiguration, data plane information transmission between the terminal side device and the wireless backhaul device may be simultaneously performed when the procedure in FIG. 14 is performed. With reference to the method 1 or the method 2 in FIG. 14, if the first network device sends, to the second network device, the CORESET configured by the first network device for the wireless backhaul device, the wireless backhaul device may perform data transmission with the terminal side device based on an original configuration. If receiving the CORESET configured by the second network device for the wireless backhaul device, the wireless backhaul device avoids, when communicating with the terminal side device, the resource indicated by the CORESET configured by the second network device for the wireless backhaul device. For example, reference may be made to FIG. 15.

It may be understood that the network devices may alternatively be core network devices. For example, the first network device is a first core network device, and the second network device is a second core network device. When the wireless backhaul device is handed over from the first core network device to the second core network device, the communications method described in the foregoing embodiments may also be used.

The foregoing mainly describes the solutions in the embodiments of this application from a perspective of interaction between network elements. It may be understood that, to implement the foregoing functions, each network element such as the wireless backhaul device, the first network device, or the second network device, includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional unit division may be performed on the wireless backhaul device and the network device according to the foregoing method examples. For example, each functional unit may be divided according to each function, or two or more functions may be integrated into one processing unit. The integrated unit may be implemented in a form of hardware, or may be implemented in a form of a software functional unit. It should be noted that, in the embodiments of this application, unit division is an example, and is merely a logical function division. In actual implementation, another division manner may be used.

Figure 16:
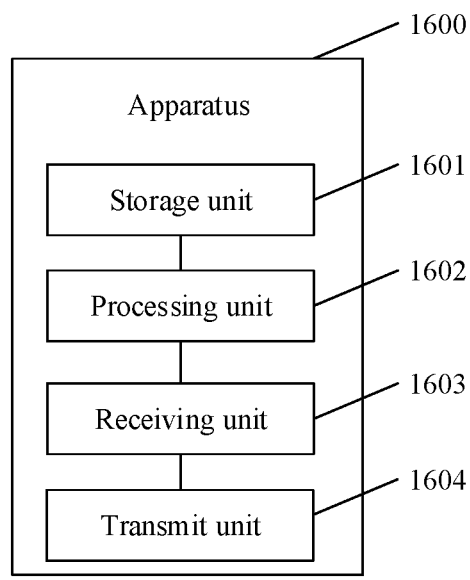
FIG. 16 is a schematic structural diagram of an apparatus according to an embodiment of this application.

When an integrated unit is used, FIG. 16 is a schematic block diagram of an apparatus according to an embodiment of the present invention. The apparatus may exist in a form of software, or may be a wireless backhaul device, or may be a chip in a wireless backhaul device. The apparatus 1600 includes a processing unit 1602, a receiving unit 1603, and a transmit unit 1604. The processing unit 1602 is configured to control and manage an action of the apparatus 1600. For example, the processing unit 1602 is configured to support the apparatus 1600 in detecting a downlink control channel PDCCH sent by a second network device, and/or is used in another process of the technology described in this specification (for details, refer to the method corresponding to any one of FIG. 9 to FIG. 15). The receiving unit 1603 is configured to support a receiving step from another network element (for example, a terminal side device, a first network device, or the second network device) to the apparatus 1600 (for details, refer to the method corresponding to any one of FIG. 9 to FIG. 15). The transmit unit 1604 is configured to perform a sending step from the apparatus 1600 to another network element (for example, the terminal side device, the first network device, or the second network device) (for details, refer to the method corresponding to any one of FIG. 9 to FIG. 15). The apparatus 1600 may further include a storage unit 1601, configured to store program code and data of the apparatus 1600.

The processing unit 1602 may be a processor or a controller, such as a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor 1602 may implement or execute various example logical blocks, modules, and circuits that are described with reference to content disclosed in this application. The processor may be a combination of processors implementing a computing function, for example, a combination of one or more microprocessors, or a combination of the DSP and a microprocessor. The receiving unit 1603 and the transmit unit 1604 may be integrated into a communications interface. The communications interface is a general term. In specific implementation, the communications interface may include a plurality of interfaces, for example, may include an interface between the wireless backhaul device and the terminal side device, an interface between the wireless backhaul device and the first network device, an interface between the wireless backhaul device and the second network device, and/or another interface. The storage unit 1601 may be a memory.

When the processing unit 1602 is the processor, the receiving unit 1603 and the transmit unit 1604 are integrated into the communications interface, and the storage unit 1601 is the memory, a structure of the apparatus 1600 in this embodiment of this application may be the structure of the wireless backhaul device shown in FIG. 6.

Figure 17:
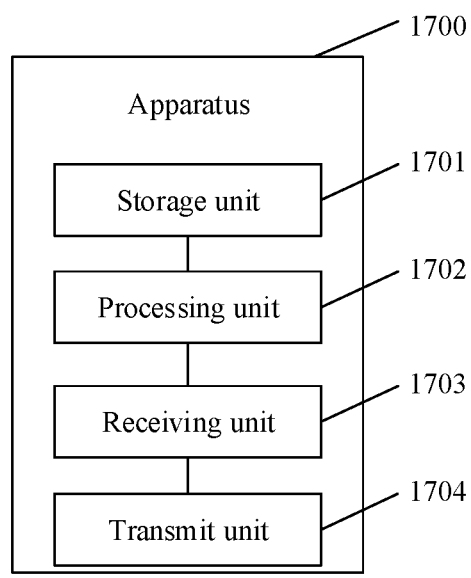
FIG. 17 is a schematic structural diagram of another apparatus according to an embodiment of this application.

When an integrated unit is used, FIG. 17 is a schematic block diagram of another apparatus according to an embodiment of the present invention. The apparatus may exist in a form of software, or may be a network device, or may be a chip in a network device. The apparatus 1700 includes a processing unit 1702, a receiving unit 1703, and a transmit unit 1704, and may further include a storage unit 1701. The schematic structural diagram shown in FIG. 17 may be used to represent a structure of the first network device or the second network device in the foregoing embodiments.

When FIG. 17 is used to represent the structure of the first network device, the processing unit 1702 is configured to control and manage an action of the first network device. For example, the processing unit 1702 is configured to support the first network device in performing step 1002 in FIG. 10, step 1202 in FIG. 12, step 1302 in FIG. 13, step 1402 in FIG. 14, step 1502 in FIG. 15, and/or another process of the technology described in this specification. The receiving unit 1703 is configured to implement a receiving step from another network element (for example, a terminal side device, a wireless backhaul device, or the second network device) to the first network device, and the transmit unit 1704 is configured to implement a sending step from the first network device to another network element (for example, the terminal side device, the wireless backhaul device, or the second network device). The apparatus 1700 may further include the storage unit 1701, configured to store program code and data of the first network device.

When FIG. 17 is used to represent the structure of the second network device, the processing unit 1702 is configured to control and manage an action of the second network device. For example, the processing unit 1702 is configured to support the second network device in performing step 903 in FIG. 9, step 1009 in FIG. 10, and/or another process of the technology described in this specification. The receiving unit 1703 is configured to implement a receiving step from another network element (for example, a terminal side device, a wireless backhaul device, or the first network device) to the second network device, and the transmit unit 1704 is configured to implement a sending step from the second network device to another network element (for example, the terminal side device, the wireless backhaul device, or the first network device). The apparatus 1700 may further include the storage unit 1701, configured to store program code and data of the second network device.

The processing unit 1702 may be a processor or a controller, such as a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor 1702 may implement or execute various example logical blocks, modules, and circuits that are described with reference to content disclosed in this application. The processor may be a combination of processors implementing a computing function, for example, a combination of one or more microprocessors, or a combination of the DSP and a microprocessor. The receiving unit 1703 and the transmit unit 1704 may be integrated into a communications interface. The communications interface is a general term. In specific implementation, the communications interface may include a plurality of interfaces, for example, may include an interface between one network device and the terminal side device, an interface between one network device and the wireless backhaul device, and/or another interface. The storage unit 1701 may be a memory.

When the processing unit 1702 is the processor, the receiving unit 1703 and the transmit unit 1704 are integrated into the communications interface, and the storage unit 1701 is the memory, a structure of the apparatus 1700 in this embodiment of this application may be the structure of the network device shown in FIG. 7.

An embodiment of this application further provides a computer-readable storage medium, including an instruction. When the instruction is run on a computer, the computer is enabled to perform any one of the foregoing methods.

An embodiment of this application further provides a computer program product including an instruction. When the computer program product runs on a computer, the computer is enabled to perform any one of the foregoing methods.

An embodiment of this application further provides an apparatus. The apparatus exists in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any one of the foregoing methods. In this case, the methods provided in the embodiments of this application may be performed by the chip.

An embodiment of this application further provides a communications system, including a first network device, a second network device, a wireless backhaul device, and a network side device.

The methods or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to the processor, so that the processor can read information from the storage medium or write information to the storage medium. Certainly, the storage medium may be a component of the processor. The processor and the storage medium may be located in an ASIC. In addition, the ASIC may be located in an access network device or the terminal side device. Certainly, the processor and the storage medium may exist in the access network device or the terminal side device as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, to be specific, may be located in one position, or may be distributed on a plurality of network device. Some or all of the units may be selected based on actual requirements to achieve the objectives of the solutions of the embodiments.

In addition, functional units in the embodiments of the present invention may be integrated into one processing unit, or each of the functional units may exist independently, or two or more units are integrated into one unit. The integrated unit may be implemented in a form of hardware, or may be implemented in a form of hardware in addition to a software functional unit.

Based on the descriptions of the foregoing implementations, a person skilled in the art may clearly understand that this application may be implemented by software in addition to necessary universal hardware or certainly may be implemented by hardware only. In most circumstances, the former is a preferred implementation. Based on such an understanding, the technical solutions of this application essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications method, comprising:
receiving, by a second network device, a first message sent by a first network device,
wherein the first message carries first indication information, the first indication information comprises:
information about a resource that is of a first link and that is configured by a wireless backhaul device,
information about a resource that is of a third link and that is determined by the first network device based on the information about the resource of the first link, or
information about a resource that is of the first link and that is configured by the first network device,
wherein the first message is used to request to hand over the wireless backhaul device to the second network device,
wherein the first link is a communications link between the wireless backhaul device and a terminal side device, and
wherein the third link is a communications link between the wireless backhaul device and the first network device; and
sending, by the second network device, a second message to the first network device, wherein the second message is used to indicate that the request for handing over the wireless backhaul device to the second network device is accepted.

2. The communications method according to claim 1, wherein the second message carries configuration information about the resource of the first link.

3. The communications method according to claim 1, wherein the first message further carries second indication information, the second indication information is used to indicate a resource of a second link, the resource of the second link is a resource that is available when the wireless backhaul device detects a downlink control channel sent by the second network device, and the second link is a communications link between the wireless backhaul device and the second network device.

4. The communications method according to claim 1, wherein the second message further carries third indication information, the third indication information is used to indicate a resource of a second link, the resource of the second link is a resource that is available when the wireless backhaul device detects a downlink control channel sent by the second network device, and the second link is a communications link between the wireless backhaul device and the second network device.

5. A communications apparatus, comprising: a memory storing instructions and a processor coupled with the memory, wherein the instructions are executed by the processor to cause the apparatus to perform a method comprising:
sending a first message to a second network device,
wherein the first message carries first indication information, and the first indication information comprises:
information about a resource that is of a first link and that is configured by a wireless backhaul device,
information about a resource that is of a third link and that is determined by the apparatus based on the information about the resource of the first link, or
information about a resource that is of the first link and that is configured by the communications apparatus,
wherein the first message is used to request to hand over the wireless backhaul device to the second network device,
wherein the first link is a communications link between the wireless backhaul device and a terminal side device, and
wherein the third link is a communications link between the wireless backhaul device and the communications apparatus; and
receiving a second message sent by the second network device, wherein the second message is used to indicate that the request for handing over the wireless backhaul device to the second network device is accepted.

6. The communications apparatus according to claim 5, wherein
the second message carries configuration information about the resource of the first link.

7. The communications apparatus according to claim 6, wherein after the receiving the second message sent by the second network device, the method further comprises:
sending a third message to the wireless backhaul device, wherein the third message carries the configuration information about the resource of the first link, and the third message is used to indicate the wireless backhaul device to be handed over to the second network device.

8. The communications apparatus according to claim 5, wherein the first message further carries second indication information, the second indication information is used to indicate a resource of a second link, the resource of the second link is a resource that is available when the wireless backhaul device detects a downlink control channel sent by the second network device, and the second link is a communications link between the wireless backhaul device and the second network device.

9. The communications apparatus according to claim 5, wherein the second message further carries third indication information, the third indication information is used to indicate a resource of a second link, the resource of the second link is a resource that is available when the wireless backhaul device detects a downlink control channel sent by the second network device, and the second link is a communications link between the wireless backhaul device and the second network device.

10. A communications apparatus, comprising: a memory storing instructions, and a processor coupled with the memory, wherein the instructions are executed by the processor to cause the apparatus to perform a method comprising:
   receiving a first message sent by a first network device, wherein the first message carries first indication information, the first indication information comprises:
      information about a resource that is of a first link and that is configured by a wireless backhaul device,
      information about a resource that is of a third link and that is determined by the first network device based on the information about the resource of the first link, or
      information about a resource that is of the first link and that is configured by the first network device,
   wherein the first message is used to request to hand over the wireless backhaul device to the apparatus,
   wherein the first link is a communications link between the wireless backhaul device and a terminal side device, and
   wherein the third link is a communications link between the wireless backhaul device and the first network device; and
   sending a second message to the first network device, wherein the second message is used to indicate that the request for handing over the wireless backhaul device to the apparatus is accepted.

11. The communications apparatus according to claim 10, wherein the second message carries configuration information about the resource of the first link.

12. The communications apparatus according to claim 10, wherein the first message further carries second indication information, the second indication information is used to indicate a resource of a second link, the resource of the second link is a resource that is available when the wireless backhaul device detects a downlink control channel sent by the apparatus, and the second link is a communications link between the wireless backhaul device and the apparatus.

13. The communications apparatus according to claim 10, wherein the second message further carries third indication information, the third indication information is used to indicate a resource of a second link, the resource of the second link is a resource that is available when the wireless backhaul device detects a downlink control channel, and the second link is a communications link between the wireless backhaul device and the apparatus.

* * * * *